(12) United States Patent
Miyamoto et al.

(10) Patent No.: US 7,602,962 B2
(45) Date of Patent: Oct. 13, 2009

(54) METHOD OF CLASSIFYING DEFECTS USING MULTIPLE INSPECTION MACHINES

(75) Inventors: Atsushi Miyamoto, Yokohama (JP); Hirohito Okuda, Yokohama (JP); Toshifumi Honda, Yokohama (JP); Yuji Takagi, Kamakura (JP); Takashi Hiroi, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 709 days.

(21) Appl. No.: 10/762,091

(22) Filed: Jan. 20, 2004

(65) Prior Publication Data
US 2004/0218806 A1 Nov. 4, 2004

(30) Foreign Application Priority Data
Feb. 25, 2003 (JP) ............... 2003-047290

(51) Int. Cl.
*G06K 9/00* (2006.01)
(52) U.S. Cl. .................................... 382/149
(58) Field of Classification Search ................. 382/149
See application file for complete search history.

(56) References Cited

U.S. PATENT DOCUMENTS

| | | | | |
|---|---|---|---|---|
| 5,917,935 A | * | 6/1999 | Hawthorne et al. | 382/149 |
| 6,026,177 A | * | 2/2000 | Mong et al. | 382/156 |
| 6,075,880 A | * | 6/2000 | Kollhof et al. | 382/141 |
| 6,092,059 A | * | 7/2000 | Straforini et al. | 706/14 |
| 6,097,887 A | | 8/2000 | Hardikar et al. | |
| 6,148,099 A | * | 11/2000 | Lee et al. | 382/149 |
| 6,233,719 B1 | | 5/2001 | Hardikar et al. | |
| 6,408,219 B2 | * | 6/2002 | Lamey et al. | 700/110 |
| 6,775,819 B1 | | 8/2004 | Hardikar et al. | |
| 6,968,079 B2 | | 11/2005 | Yoshikawa et al. | |
| 2001/0011706 A1 | * | 8/2001 | Nara et al. | 250/397 |
| 2001/0015805 A1 | * | 8/2001 | Nara et al. | 356/394 |
| 2001/0016061 A1 | * | 8/2001 | Shimoda et al. | 382/149 |
| 2001/0042705 A1 | * | 11/2001 | Nakagaki et al. | 209/44.4 |
| 2001/0048761 A1 | | 12/2001 | Hamamatsu et al. | |
| 2002/0164070 A1 | * | 11/2002 | Kuhner et al. | 382/159 |
| 2002/0181756 A1 | * | 12/2002 | Shibuya et al. | 382/145 |
| 2003/0054573 A1 | * | 3/2003 | Tanaka et al. | 438/4 |

FOREIGN PATENT DOCUMENTS

| | | |
|---|---|---|
| JP | 1999-344450 | 12/1999 |
| JP | 2000-57349 A | 2/2000 |
| JP | 2000-097871 | 4/2000 |
| JP | 2001-127129 | 5/2001 |
| JP | 2001-134763 | 5/2001 |
| JP | 2001-135692 | 5/2001 |
| JP | 2001-509619 | 7/2001 |
| JP | 2001-250852 A | 9/2001 |
| JP | 2001-256480 | 9/2001 |
| JP | 2001-331748 | 11/2001 |
| JP | 2002-090312 | 3/2002 |
| WO | WO 99/01842 A1 | 1/1999 |

* cited by examiner

*Primary Examiner*—Bhavesh M Mehta
*Assistant Examiner*—David P Rashid
(74) *Attorney, Agent, or Firm*—Townsend and Townsend and Crew LLP

(57) ABSTRACT

The present invention provides a method of classifying defects wherein defects are detected in a first inspection machine. The detected defects are then reviewed by a second inspection machine. A sampling rate for review by the second inspection machine is determined by a defect classifier in the first inspection machine.

4 Claims, 13 Drawing Sheets

DEFECT CLASS/DEFECT CLASSIFIER SETUP PROCEDURE

DEFECT PROCEDURE

FIG. 11

① COARSE CLASSIFICATION RESULT (UNADJUSTED) –
FINE CLASSIFICATION RESULT (UNADJUSTED)

| ↓Pattern/→Review | Cb1 | Cb2 | Cb3 | Cb4 |
|---|---|---|---|---|
|  |  |  | mix |  |
| Ca1 |  | 3 |  |  |
| Ca2 | mix |  | 2 | 1 |
| Ca3 | mix |  | 2 | 1 |

1101
1104

② COARSE CLASSIFICATION RESULT (UNADJUSTED) –
FINE CLASSIFICATION RESULT (ADJUSTED)

| ↓Pattern/→Review | Cb1 | Cb2 | Cb3 | Cb4 | Cb5 |
|---|---|---|---|---|---|
|  |  |  |  |  |  |
| Ca1 |  | 3 |  |  |  |
| Ca2 | mix |  | 2 |  | 1 |
| Ca3 | mix |  |  | 2 | 1 |

1102
1105
1106

③ COARSE CLASSIFICATION RESULT (ADJUSTED) –
FINE CLASSIFICATION RESULT (ADJUSTED)

| ↓Pattern/→Review | Cb1 | Cb2 | Cb3 | Cb4 | Cb5 |
|---|---|---|---|---|---|
|  |  |  |  |  |  |
| Ca1 |  | 3 |  |  |  |
| Ca2 | mix |  | 2 |  | 1 |
| Ca3 |  |  |  | 2 |  |
| Ca4 |  |  |  |  | 1 |

1103
1107

DEFECT INSPECTION MACHINE A

DEFECT INSPECTION MACHINE B

METHOD OF CLASSIFYING DEFECTS USING MULTIPLE INSPECTION MACHINES

BACKGROUND OF THE INVENTION

The present invention relates to a method of generating a defect classifier, which classifies foreign matter and defects arising on a semiconductor wafer or other sample in a semiconductor manufacturing process, a method of classifying defects with the generated defect classifier, and a system for such defect classification.

A semiconductor device is manufactured by subjecting a wafer, which serves as a substrate, to a plurality of processes such as exposure, development, and etching. After completion of a predetermined processing step of a plurality of processing steps, an optical or SEM (Scanning Electron Microscope) type foreign matter inspection machine or pattern inspection machine is used to conduct an inspection for the purpose of determining the location and size of a defect. The number of detected defects depends on the manufacturing process condition. However, it may range from several hundred to several thousand per wafer. Therefore, the defect inspection machines are required to offer a high defect detection speed. The inspection machines for detecting defects are hereinafter generically referred to as defect detection machines.

After inspection by such a defect detection machine, an optical or SEM-type defect review machine having a higher image magnification may be used to conduct a fine reinspection on defects detected by the defect detection machine. When time limitations are considered, however, it is not practical to conduct a fine inspection on all defect samples detected by the defect detection machine. Therefore, a set of defects detected by the defect detection machine is first sampled, and then its subset is subjected to a fine inspection. The defect inspection machines for conducting the above defect review inspection are hereinafter generically referred to as defect review machines. Further, the defect detection machines, defect review machines, SPMs (Scanning Probe Microscopes), elemental analysis machines, and other similar inspection machines are collectively referred to as defect inspection machines.

Some of the developed defect review machines incorporate a function of automatically acquiring an defect image enlargement in accordance with the defect location information derived from a defect detection machine, that is, the ADR (Automatic Defect Review) function, and a function of acquiring detailed information about a defect, including its size, shape, and texture (surface pattern), from the defect image enlargement and automatically determining the type of the defect, that is, the ADC (Automatic Defect Classification) function. Meanwhile, some of the developed defect detection machines incorporate a function for rough defect classification, which can be exercised without sacrificing the high processing speed. This classification function is called "RT-ADC (Real Time-ADC)".

As regards the methods for automatically classifying defects in accordance with various inspection information, a variety of techniques have long been studied as a multivariate analysis method in a pattern recognition field.

One classical methodology is a method called "rule-based classification". This methodology extracts various image feature amounts from an image targeted for. classification, judges the image feature amount values in accordance with "if-then" rules incorporated into the system, and categorizes a defect into one of defect classes. The rule-based classification method deals with fixed defect classes and classification rules and cannot flexibly respond to user requests. However, it is advantageous in that it can be used immediately after production process startup because it does not require any teaching data.

Another classical methodology is a method called "learning classification". This methodology gathers teacher images in advance and then learns them to optimize the classification rules (e.g., neural net). The learning classification method provides flexible classification in compliance with user requests. However, it is generally necessary to gather a large amount of teaching data in order to obtain satisfactory performance. Therefore, it cannot practically be used at the time of production process startup. If only a small amount of teaching data is used, it is understood that the performance deteriorates because excessive learning occurs. Excessive learning is a phenomenon in which the learning is excessively adapted to teaching data.

As a combination of the above rule-based classification and learning classification methods, an automatic defect classification method, which can be adapted uniformly in a hybrid, is disclosed by Japanese Patent Laid-open No. 2001-135692.

The conventional technologies for defect classification are also disclosed by Japanese Patent Laid-open Nos. 1999-344450, 2001-93950, 2001-127129, 2001-256480, 2001-331784, 2002-14054, and 2002-90312.

However, even when a user's classification request does not comply with the classification results generated by a defect classifier, which is derived from the above rule-based classification method, learning classification method, or their combination, it is not easy to correct the system's internal classification standard. More specifically, if the meanings of various attributes used as classification judgment criteria are vague when the above rule-based classification method is used, it is difficult for the user to customize various attributes in compliance with the user's own classification request by, for instance, making attribute selections and defining threshold values. Further, if many attributes are inadvertently readied as feature amounts in a situation where the classification rules are automatically generated during the use of the learning classification method, the degree of leaning freedom increases so that excessive learning may occur as the learning is excessively adapted to a small mount of teaching data. To avoid such a problem, an increased number of teaching samples are necessary. The same problem arises when the rule-based classification and learning classification methods are combined. Further, it is also necessary to determine the proper configuration for such a combination.

The defect attributes that can be derived from a defect inspection machine include image feature amounts, defect coordinates, composition analysis results, manufacture initiation history data, machine QC (Quality Control) data, information with respect to the distribution of defect locations detected on a wafer, and the number of defects. In some cases, it is also possible to reference the attributes obtained from a plurality of different types of defect inspection machines such as an optical or SEM foreign matter inspection machine, pattern inspection machine, defect review machine, SPM, and elemental analysis machine. Automatic defect classification is performed using the above attributes as judgment criteria. However, it is not easy for the user to handle a large amount of attribute data properly and generate a defect classifier that conforms to an expected defect classification standard.

SUMMARY OF THE INVENTION

To solve the above problem and afford an adequate user support, the present invention provides a method of generating a defect classifier, which makes it possible to clarify the user's classification requests, generate defect classes, and categorize defects into various defect classes, a method of classifying defects with the generated defect classifier, and a system for such defect classification.

To cover a situation where a defect inspection is conducted with a plurality of defect inspection machines, the present invention also provides a method of generating defect classes for each defect inspection machine as well as a defect classifier, a method and system for classifying defects, a method of assuring data consistency between inspection machines, and a method of data interpolation.

More specifically, the present invention provides a method of inspecting a sample to detect defects, acquiring the images of detected defects, extracting the defect feature amounts from the acquired defect images, and classifying the detected defects with a classifier that classifies defects using the information about the extracted defect feature amounts. The classifier has a decision tree, which hierarchically expands defect class elements (classification class elements of defect) via branch elements. For the branch elements, classification rules are defined on an individual basis.

Further, the present invention provides a method of classifying defects, which comprises the step of determining the rate of defects sampled and detected by a second inspection machine among defects detected by a first inspection machine, and the step of classifying defects detected by the second inspection machine in accordance with the rate of the sampling for each defect class determined about the defects detected by the first inspection machine when the sample targeted for inspection is inspected. The step of determining the rate of defects to be sampled and detected by the second inspection machine inspects an inspection sample with the first inspection machine, classifies the defects detected by the first inspection machine into various defect classes with a first defect classifier, and determines the rate of defects to be sampled for each defect class in accordance with the reliability of each defect class that is defined by the first defect classifier. The step of classifying defects detected by the second inspection machine in accordance with the determined sampling rate for each defect class detects defects by inspecting the sample targeted for inspection with the first inspection machine, classifies the detected defects into various defect classes with the first defect classifier, detects the defects classified with the first defect classifier with the second defect inspection machine in accordance with the determined sampling rate for each defect class, classifies the defects detected by the second defect inspection machine in accordance with the sampling rate with a second defect classifier, and displays the result of classification provided by the second defect classifier on screen.

To generate a defect classifier that satisfies the user's defect classification request according to the present invention, it is first necessary to judge whether various attributes are valid as judgment criteria for the defect classifier. As a scheme for visually linking the user's classification requests with the validity of various attributes for the classification requests, the present invention provides a GUI (Graphic User Interface) that is capable of visualizing the distribution of the attributes independently, in a combined form as needed, or after an arbitrary conversion (major constituent analysis of a plurality of arbitrary attributes, compression process for the number of attribute dimensions, arbitrary conversion process by kernel-function etc., etc.) The attributes contain at least one of image feature amounts, defect classification results, defect coordinates, composition analysis results, manufacture initiation history data, machine QC data, information about the distribution of defect locations detected on a wafer, and the number of defects.

Meanwhile, the defect classifier according to the present invention comprises a decision tree, which hierarchically classifies defects in accordance with a plurality of branches. In accordance with the visualized distribution of various attributes, the user can grasp the degree of separation of each attribute among defect samples belonging to various defect classes that are divided by arbitrary branches of the decision tree. The degree of separation of various attributes is an index for judging whether such information is valid as a classification standard for each branch. While various attributes are made use of selectively or collectively in accordance with such information, the process for decision tree determination, classification rule selection, or parameter control is performed. The details of these processes are determined in compliance with the above user's defect classification request.

When an inspection is conducted with a combination of two or more defect inspection machines such as a defect detection machine and defect review machine, the present invention selectively or collectively uses inspection information derived from both inspection machines and generates a defect classifier that includes defect classes matching the user's classification request. Next, the present invention uses only the inspection information derived from the defect inspection machine and generates a defect classifier that includes defect classes representing subsets or other similar sets for defect classes designated by the user's classification request, and uses the defect classifier covering the defect classes for the defect detection machine. When the defect classes for the defect detection machine are set in this manner, hierarchical consistency can be established between the defect classes, and the defect review machine can later allow the defect classifier to conduct effective learning and effective review sampling.

As regards attributes derived from an arbitrary processed image, the present invention may allow a plurality of defect inspection machines to apply different judgment criteria to the same defect sample or defect samples of the same type. As an adjustment method in such a case, the present invention can generate a teacher pattern (a teaching pattern) from a processed image derived from an arbitrary defect inspection machine which has obtained results according to the user's expectations, an artificially generated image, CAD data, or the like, and adjust the image processing procedure or image processing parameters by using the teacher pattern in the other defect inspection machine so that the processing image of the inspection information is in agreement with or similar to the counterpart. As a result, the present invention makes it possible to use the attributes as the same judgment criteria for defect analyses by a plurality of defect inspection machines.

Further, if, due to inspected sample differences, a plurality of defect inspection machines cannot reference the inspection information about defect samples of interest by an arbitrary defect inspection machine, the present invention classifies defect samples for the defect inspection machines into some clusters in accordance with spatial defect distribution, defect classification results, or various inspection information. The present invention makes it possible to define the degree of spatial attribution belonging to the clusters to arbitrary coordinates on a defect distribution map, and interpolate the inspection information about defect samples of interest by commonly using the inspection information similar to each other or common to the same cluster for defect samples within the same cluster, or selectively using the inspection information about defect samples within the same cluster.

The foregoing and other objects, features, and advantages of the present invention will be apparent from the following more particular description of preferred embodiments of the invention, as illustrated in the accompanying drawings.

BRIEF DESCRIPTION OF THE DRAWINGS

FIG. 11 illustrates relation between the defect classes (the defective classification classes) in each defect inspection machine, which are indicated by the defect distribution maps in FIG. 9;

DETAILED DESCRIPTION OF THE PREFERRED EMBODIMENTS

Preferred embodiments of the present invention will now be described with reference to the accompanying drawings.

1. Environment

The present invention presumes that one or more defect inspection machines acquire inspection information, which can be referenced from any defect inspection machine. The defect inspection machines 101 includes the case where it is different types of defect inspection machines such as optical or SEM-type foreign matter inspection machine, optical or SEM-type pattern inspection machine, SEM-type or other-type review inspection machine, or elemental analysis machine etc. They 101 may also include the case where it is defect inspection machines used for different inspection processes no matter whether they belong to same or different type. Then, they 101 may also include the case where it is defect inspection machines with which the machines itself differ no matter whether they belong to the same or different type and the inspection processes.

Figure 1:
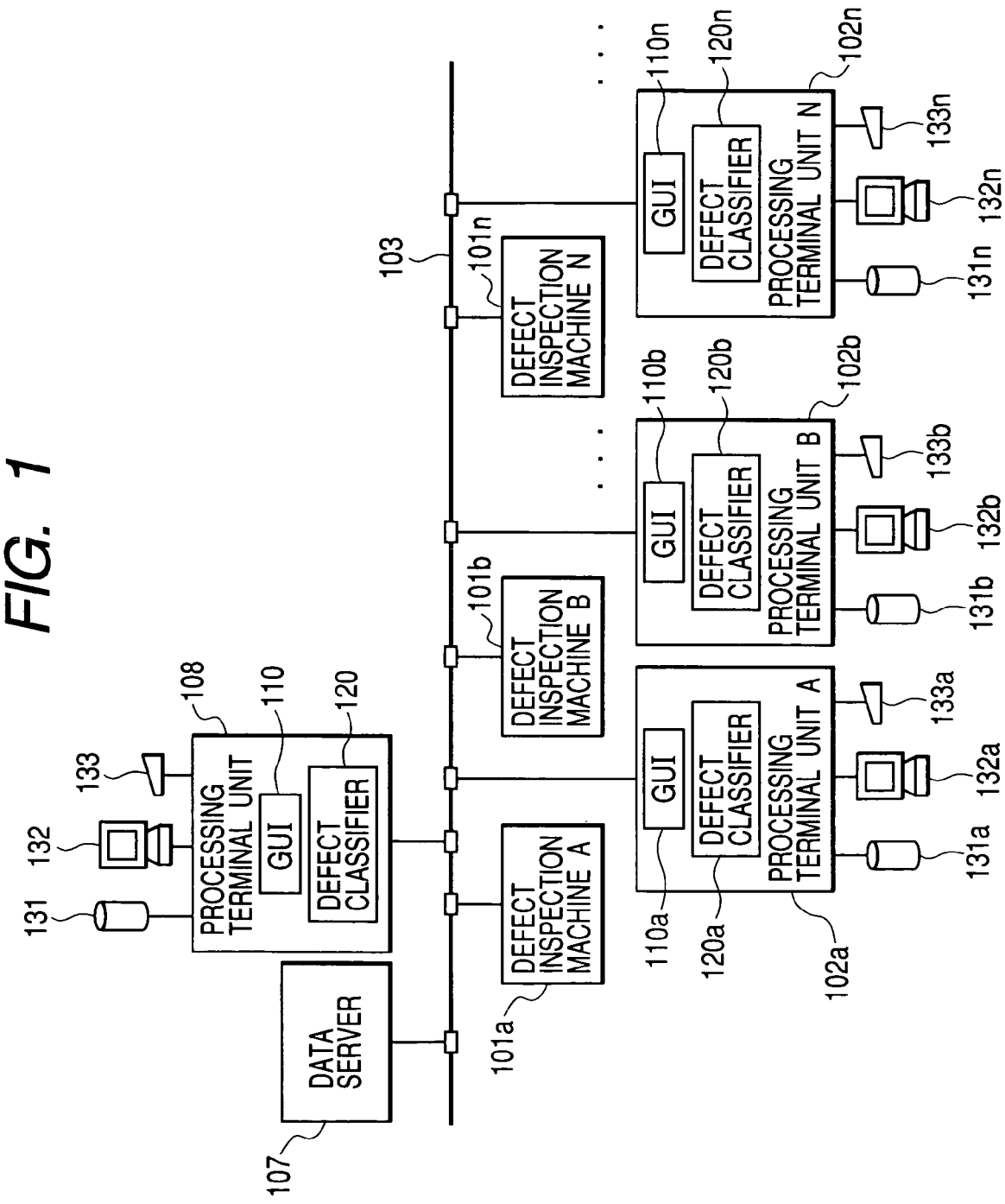
FIG. 1 is a block diagram that illustrates the configuration of a data server for sharing inspection information and various defect inspection machines in accordance with one embodiment of the present invention.

FIG. 1 is a block diagram that illustrates an automatic sample defect classification system and the configuration of various defect inspection machines included in the system in accordance with one embodiment of the present invention. Reference numerals 101a to 101n denote defect inspection machines A to N; 102a to 102n, processing terminal units A to N, which process the inspection information fed from the defect inspection machines 101a to 101n; 107, a data server; and 108, a processing terminal unit for processing the information fed from the data server 107. Information can be exchanged among components 101, 102, 107, and 108 via a network 103. The inspection information fed from the defect inspection machines 101a to 101n is processed by the processing terminal units 102a to 102n and managed and shared by the data server 107, or directly referenced by the other processing terminal units 102a to 102n or the processing terminal unit 108 for the entire system (for the data server). The inspection information is browsed, processed, or analyzed simultaneously with or after an inspection in the processing terminal units 102a to 102n for the defect inspection machines or in the processing terminal unit 108 for the system.

Figure 2:
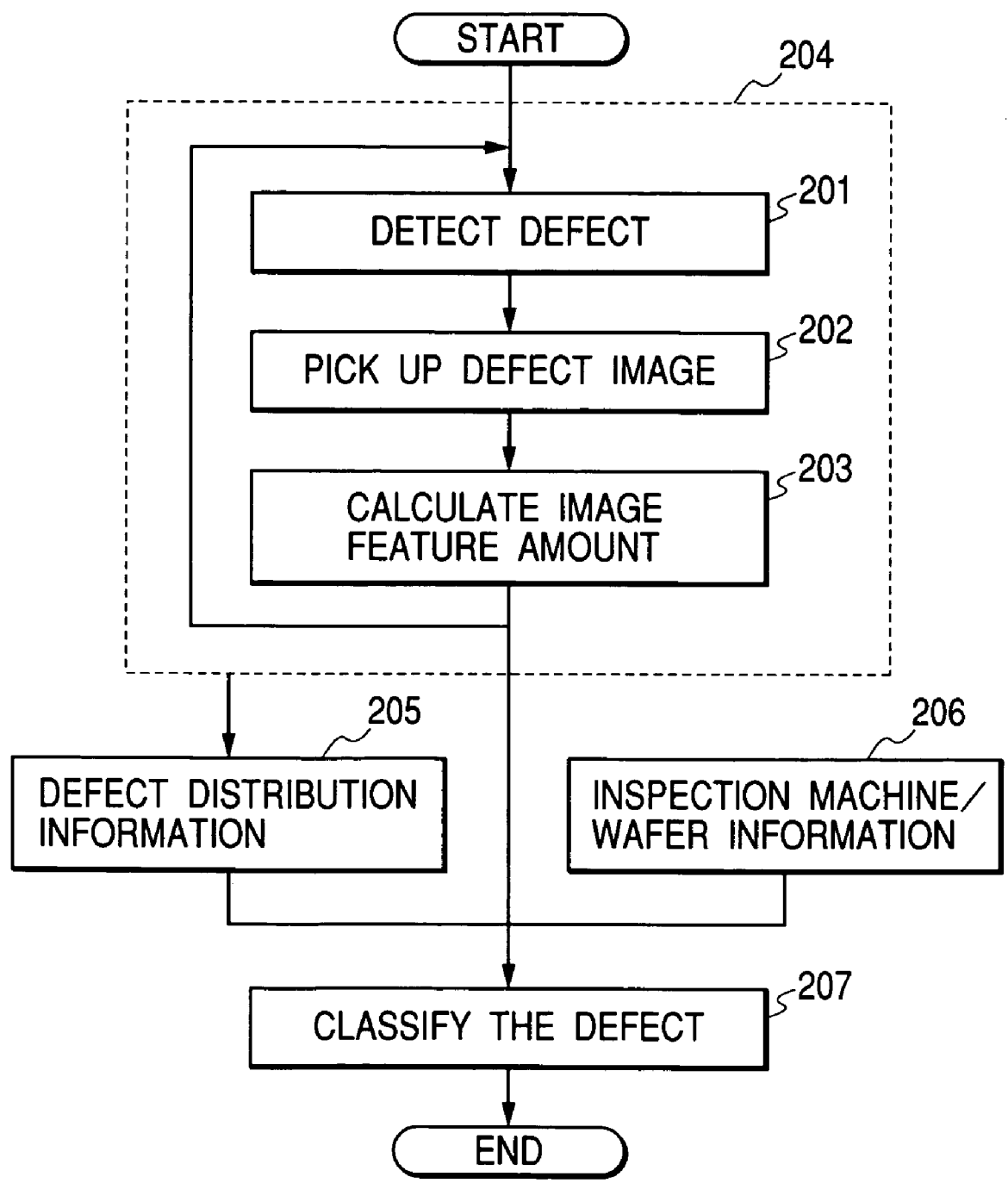
FIG. 2 is a flowchart that illustrates processes which acquires various inspection information in various defect inspection machines in accordance with one embodiment of the present invention.

The inspection information acquisition method employed by an arbitrary defect inspection machine 101 and an arbitrary processing terminal unit 102 and the types of the inspection information will now be described in detail. After completion of a process specified for semiconductor device manufacture, a defect inspection is conducted by an arbitrary defect inspection machine 101 so that various items of inspection information (various defect classification results) are obtained from a processing terminal unit 102 or 108. FIG. 2 shows the details of the above defect inspection process. In other words, FIG. 2 is a flowchart that illustrates process steps that are performed by a processing terminal unit 102 or 108 to acquire various items of inspection information (various defect classification results), which are derived from a defect inspection machine.

First of all, step 201 is performed to detect a defect location on an inspection target (a sample) of a wafer or the like and a sample inspection target (sample for generating a defect classifier 120) with an arbitrary defect inspection machine 101. In step 202, a stage (not shown) moves to the defect location and reference location to pick up an image and detect an image signal. The detected image signal is then converted to a digital image signal, which is supplied to a processing terminal unit 102 or 108.

In step 203, the processing terminal unit 102 or 108 calculates various image feature amounts concerning a defect by, for instance, comparing the picked up defect image and reference image. The processing steps within a loop 204, which is enclosed by the dotted line, are repeated in the same manner for the other defect locations. In step 205, the processing terminal unit 102 or 108 integrates the produced processing results to acquire the defect distribution information on the sample. In the defect review machine, however, the defect detection process in step 201 is performed by entering defect location information that is detected beforehand by an external foreign matter inspection machine or pattern inspection machine.

Next, step 206 is performed to acquire an inspection machine information peculiar to each defect inspection machine (e.g., information about the type (optical, SEM, AFM (Atomic Force Microscope) etc.) and information about resolution and sensitivity to each defect inspection machine), such as separately obtained machine QC (Quality Control) data and manufacture initiation history data, and a wafer information peculiar to a wafer (information about an inspection target manufacturing process and circuit structure (memory area, logic area, etc.) etc.)

In step 207, the processing terminal unit 102 or 108 performs defect classification by using a defect classifier 120 based on the defect distribution information on the sample obtained in step 205, the image feature amounts about each defect obtained in step 203, and the inspection information, which is a combination of the inspection machine information and the wafer information obtained in step 206. This defect classification is done by, for instance, using a defect classifier 120, which is generated in the processing flow shown in FIG. 3 according to the present invention, the defect classifier 120 being comprised of a decision tree which performs hierarchical defect classification in accordance with a plurality of branches.

The above inspection information includes at least either various defect images or various attributes. The various defect images include, in addition to all the defect images and reference images picked up by the detectors of the defect inspection machines 101, including the other defect inspection machines, no matter whether a defect is actually detected, at least one processed image, which is obtained by subjecting the defect images/reference images to an arbitrary image process (e.g., binarization image process or expansion/compression image process). The defect images/reference images are images that are picked up with the stage moved to the detected defect locations and reference locations on a wafer. The reference locations are locations that are on a chip other than a chip on which defects of interest exist (e.g., a neighboring chip) and correspond to the defect locations. However, an existing technology synthesizes a pseudo-reference image from a defect image by making use of the defect image's partial periodicity. Therefore, the generic term "reference image" (reference image for comparison with a defect image) is widely used. The above-mentioned processed images include a processed image that is obtained by performing an image process on at least two groups of images to combine them.

The above-mentioned various attributes include at least one of image feature amounts, defect classification results (which indicate the result of whether arbitrary defect sample is classified into which defect class), defect coordinates, composition analysis results (which indicate the result of whether arbitrary defect sample is combination of what compositions), manufacture initiation history data, machine QC data, and the distribution of defect locations detected on a wafer and the number of defects (hereinafter referred to as the defect distribution information).

The above-mentioned image feature amounts represent quantified feature, including a defect hue (texture, etc.), a defect size (area or length), and a defect shape (foreign matter shape, scratch shape, etc.) derived from the various defect images, and defect positional relationship to a wiring pattern (positional relationship indicated by a short, open, or other fatal defect), or include all or part of image feature amounts that are valid for different types of defect inspection machines and newly designed/calculated from a defect image derived from an arbitrary defect inspection machine.

The foregoing description states that steps up to 202 are performed by the defect inspection machine 101, including the actual inspection target and sample inspection target (sample for generating the defect classifier 120) whereas the subsequent processing steps and the step for generating the defect classifier 120 are performed by the processing terminal unit 102/108. Alternatively, however, the defect inspection machine 101 may perform step 204, step 205 and step 206 for acquiring the inspection information (actual inspection target and sample inspection target), and the processing terminal unit 102/108 may generate the defect classifier 120 in accordance with the inspection information and perform a defect classification process with the generated defect classifier 120.

The defect classifier 120 according to the present invention needs to be generated before classifying defects that arise on an actual inspection target.

First Embodiment

Generation of a Defect Classifier 120 According to the Present Invention in a Defect Inspection Machine The first embodiment will now be described. The first embodiment relates to automatic classification of foreign matter and defects on a semiconductor wafer (hereinafter collectively referred to as defects except in some special cases). In addition, it mainly comprises a method of a simultaneous review of inspection information that is obtained from at least one defect inspection machine 101 and a method of generating the defect classifier 120 according to the present invention, which is used with a defect inspection machine 101 or terminal processing unit 102/108. The subsequent description assumes that the defect classifier 102 is generated by one of processing terminal units 102a to 102n or a processing terminal unit 108. Therefore, in FIG. 1, each processing terminal unit 102/108 comprises calculation means, which has a function of a GUI 110 and a function of generating the defect classifier 120, storage means 131, which is connected to the calculation means, display means 132, input means 133, and the like.

1.1 Processing Flow

The processing steps according to the present invention will now be described with reference to FIG. 3. Step 301, which acquires various inspection information for generating the defect classifier 120 from a defect inspection machine 101 and processing terminal unit 102, is already completed. Therefore, various inspection information can be freely referenced. The information that can be referenced is not limited to the inspection information that is derived from a single defect inspection machine 101 as described above. When an optical or SEM defect inspection machine, an optical or SEM pattern defect inspection machine, SEM or other defect review machine, and elemental analysis machine or other different types of defect inspection machines 101 are used for defect inspection, the inspection information that is acquired from such a plurality of defect inspection machines 101 and used to generate the defect classifier 120 can also be referenced and used as needed. In such an instance, the inspection information fed from various defect inspection machines such as defect inspection machines A 101a and B 101b is processed by processing terminal units A 102a and B 102b, and a system configuration in which the inspection information is managed and shared by the data server 107 by making use of the network 103 or the like can be conceived as indicated in FIG. 1. In other words, the use of such a system configuration enables processing terminal unit 102 or 108 to acquire and share, in step 301, the inspection information that contains defect images and attributes in various defect inspection machines.

Next, at processing terminal unit 102 or 108, the user clarifies an ideal defect classification standard, which apparently ideal for the user, in accordance with a system support (a simultaneous review) (step 302) and creates defect classes (step 303). Details will be given later. When the defect classes are created in processing terminal unit 102 or 108, the next thing to do is to determine a defect classifier within the system for implementing the defect classes. The defect classifier is expressed by a decision tree that classifies defects hierarchically with a plurality of branches. The defect classifier 120 according to the present invention is completely designed by setting up individual classification rules at the branches.

The procedure comprises the steps indicated within a loop 304, which is enclosed by the dotted line. The loop 304 basically comprises five steps: "Determine a defect classification decision tree (step 305)", "Teach a defect sample (step 306)", "Evaluate the degree of separation of a defect attribute distribution (step 307)", "Select a classification rule (step 308)", and "Evaluate the classification result (step 309)". However, steps 306, 307, and 309 may be skipped if they are not necessary. If, for instance, the distribution of various defect attributes need not be referenced for classification rule determination, it is not necessary to perform steps 306 and 307. It is also possible that step 309, which is for classification result evaluation, may be skipped to proceed to the next decision tree determination step. If necessary, the above five steps may be performed in a different sequence. For example, defect samples can be first taught to all defect classes and the decision tree can be determined in accordance with the degree of separation of various defect attributes. Further, all or part of the above five steps can be performed automatically or semi-automatically.

For example, the degree of separation of the attribute distribution in step 307 can be quantified so as to enable the system to have a function of automatically determining an appropriate decision tree or classification rule in accordance with the degree of separation and selectively use the function. Further, since some patterns for defect classification decision tree determination (step 305) are already registered in the system's database, the decision tree can be determined by selecting a pattern from the database or making the database reference.

In the processing terminal unit 102 or 108, the loop 304 is repeated a required number of times. When all decision trees are determined (step 310), the process for generating the defect classifier (classification rule) 120 terminates. The individual steps will now be described in detail. First of all, defect class generation (defect classification standard determination by the user) (step 303), which is based on the system support (step 302) provided by a simultaneous review, will be described in detail.

1.2 Defect Class Determination by Simultaneous Review (Steps 302 and 303)

Step 303 is performed to visually classify defects on some defect samples for defect class determination. In this step, the user determines so as to expect what defect group will be classified as defect classes of the same kind or of the different kind according to what standard. For defect class determination, the user should first clarify his/her own defect classification standard. When classification performance is considered, the defect classifier satisfying the user's classification standard cannot always be designed. Further, inconsistencies may arise among a plurality of sets of inspection information (e.g., an inconsistency in which a foreign matter type defect is indicated by one set of inspection information while a false alarm is indicated by another set of inspection information). In such an instance, the user may be asked to formulate a consistent judgment on defect classification.

When the above is taken into consideration, it is found that simultaneous review of inspection information fed from a plurality of defect inspection machines is effective for defect class determination (step 302). Therefore, the user is offered a simultaneous inspection information review window. The window 400 is an example of a GUI (Graphic User Interface) 110, which is provided with a simultaneous review window.

When the GUI with the simultaneous review window concerning the acquired and shared inspection information is provided in the above manner, the user can comprehensively grasp the inspection information and clarify his/her own classification requirements in accordance with the GUI 110.

There are many cases where the integrated use of the plurality of inspection information is effective in defect analysis and classification. For example, an SEM defect inspection machine cannot readily observe defects in a lower layer of a wafer, whereas an optical defect inspection machine can observe lower-layer defects relatively well.

Meanwhile, the SEM defect inspection machine can observe VC (Voltage Contrast) defects, which are electrical defects inherent in a lower layer of a wafer, better than the optical defect inspection machine. It is also known that defect detection machines having a large visual field (low resolution) tend to be capable of observing VC and other similar defects better than the other machines.

As described above, the inspection information derived from the above-mentioned various defect inspection machines has both advantages and disadvantages depending the defect type. A variety of information, which can be obtained from the use of differing detection methods and processing methods, is effective in defect analysis and classification no matter whether the information is derived from different types of defect inspection machines or the same defect inspection machine.

1.2.1 Simultaneous Review (Defect Distribution Map Display) (step 302)

A method for displaying a defect map will now be described with reference to FIG. 4.

Figure 4:
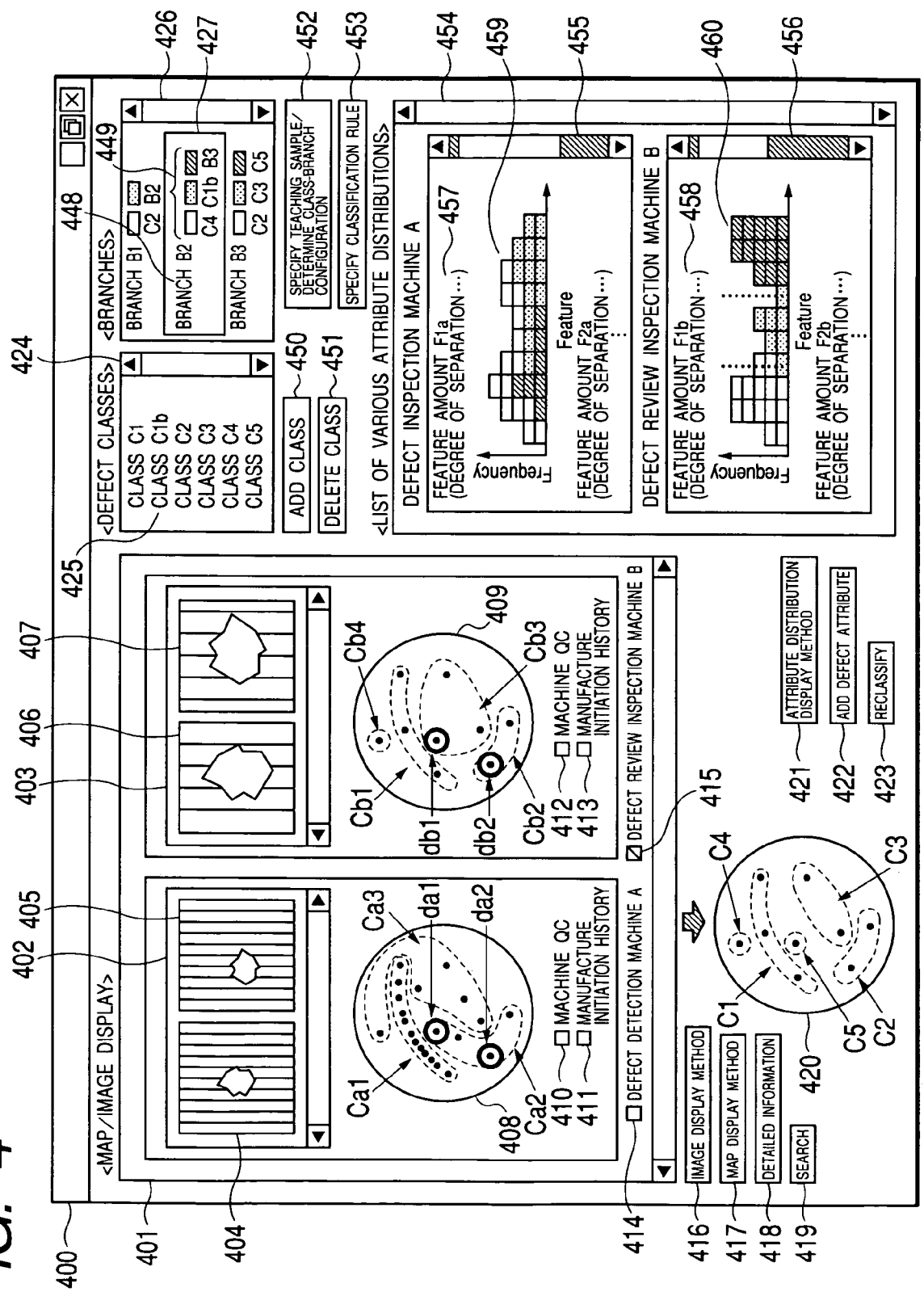
FIG. 4 shows a window that presents a simultaneous review of inspection information, the distribution of various defect attributes, and a list of defect classes and branches in accordance with one embodiment of the present invention.

FIG. 4 shows a window that presents a simultaneous review of inspection information, the distribution of various defect attributes, and a list of defect classes and branches in accordance with one embodiment of the present invention.

Simultaneous viewing of a plurality of sets of inspection information is effective in acquiring an integrated idea. Therefore, step 302 shown in FIG. 3 presents an inspection information simultaneous review window to the user. The window shown in FIG. 4 is an example of a GUI for the system (e.g., the processing terminal unit 102 or 108) shown in FIG. 1. To implement the GUI 120, as a matter of course, the system (e.g., the processing terminal unit 102 or 108) comprises a display unit 132, a computer (including storage means 131 for storing various data) for performing an interactive operation with drawings and images on the display unit, and input means 133 such as a keyboard. Further, the computer includes a defect classifier 120, which is customized in accordance with the inspection information according to the present invention.

Next, the information referenced in step 302 will be described in detail. The GUI shown in the window 400 is capable of displaying a defect distribution map about an arbitrary defect inspection machine. When an inspection is conducted by a plurality of defect inspection machines, the window 400 neatly arranges displayed defect distribution maps about individual defect inspection machines. From now on, a situation where the inspection information concerning two defect inspection machines (defect detection machine A and defect review machine B) can be both referenced will be described as an example. However, the present invention is not limited to this combination. The present invention is also applicable to at least one defect inspection machine combination of different types of defect inspection machines, the same type of defect inspection machines which perform different inspection processes, or different machines (units) in defect inspection machines of the same type which perform the same inspection process. Further, the setup of a defect classifier 120b for defect review machine B will be subsequently described. The setup may be applicable to a defect classifier 120 for an arbitrary defect inspection machine 101 or processing terminal unit 102 or 108.

In the present embodiment, reference numerals 408 and 409 denote defect distribution maps, which respectively show the defect distributions of defect detection machine A and defect review machine B. Reference numeral 420 denotes a defect distribution map indicating the defect distribution that is obtained upon re-classification conducted by a defect classifier of the present invention, which is customized according to the inspection information derived from defect detection machine A and defect review machine B. With defect distribution map 420, it is possible to customize a defect classifier interactively while viewing the classification result produced by the defect classifier that is set.

When a specified setup procedure is performed after pressing a "Map Display Method" button 417, defect distribution maps 408, 409, and 420 display the defect classification results of defect samples and the defect distributions of various defect attributes and the like two-dimensionally or three-dimensionally by using characters, numerical values, different colors, highlighting, and the like. This function enables the user to grasp the overall images of the defect distributions. Another function is also provided to display machine QC data and manufacture initiation history data for individual defect inspection machines. Check boxes 410 and 412 are used to display machine QC data, and check boxes 411 and 413 are used to display manufacture initiation history data.

1.2.2 Defect Image Display (step 302)

The inspection information simultaneous review window 401 shown in FIG. 4 is capable of displaying the defect images of a plurality of specified defect samples in such a manner that they are neatly arranged and can be simultaneously viewed. For example, two defect samples da1, da2, which are within the defect distribution map 408 for defect detection machine A, respectively correspond to defect samples db1 and db2, which are within the defect distribution map 409 for defect review machine B. However, defect samples da1 (db1) and da2 (db2) are classified into the same class Ca2 in defect detection machine A, but classified into different classes Cb3, Cb2 in defect review machine B.

When defect sample da1 is selected, and then dragged and dropped into window 402, the defect image 404 of defect sample da1, which is acquired in defect detection machine A, can be displayed as shown in the figure. When defect sample da1 appears on the display, the defect image 406 of defect sample db1 automatically appears within window 403 if defect sample db1 of defect review machine B, which corresponds to defect sample da1, exists within defect distribution map 409.

The above function works so that when defect sample da1 or db1 is dragged and dropped into window 402 or 403, the other defect sample appears in the other window. Similarly, when defect sample da2 or db2 is selected, defect images 405 and 407 appear in windows 402 and 403.

The simultaneous defect review images of defect images 404 through 407 enable the user to judge whether the two defect samples da1 (db1), da2 (db2) should be classified into different defect classes. To provide user support in this instance, an "Image Display Method" button 416 is furnished. When a specified procedure is performed after pressing this button, the defect images can be both displayed.

Further, the press of a "Detailed Information" button 418 simultaneously displays a list of inspection information about a defect sample specified within a defect distribution map. The press of a "Search" button 419 initiates a search for similar defects. A search formula is specified to define the search to be conducted. The search formula is used to specify a target defect inspection machine, the search range such as a specific wafer surface area, and the arbitrary inspection information or its combination.

Defect class determination in step 303 can be achieved visually by the user in accordance with the aforementioned simultaneous review window 401. However, it is possible to automatize all or part of the defect class determination process by introducing a specific knowledge-based rule such as "it is highly probable that the defect classification result may be a VC defect or false alarm if a defect is detected by a SEM defect inspection machine and not detected by an optical defect inspection machine". This is the same also about generation of the defect classifier according to the present invention.

1.2.3 Defect Class Creation (step 303)

Step 303 will now be described. Step 303 is performed to specify the names and number of defect classes in accordance with the user's ideal defect classification standard, which is confirmed from the above simultaneous review window 401.

If, for instance, the defect classification standard requested by the user comprises five classes (classes C1 through C5) as shown in defect map 420, window 424 additionally displays five defect classes, for which arbitrary labels are set, when a specified procedure is performed after pressing an "Add Class" button 450. Window 424 in the figure displays six classes. The label 425 for defect class C1b is displayed for subsequent explanation purposes. It is assumed that such a label does not exist now. Any defect class can be deleted by selecting it from window 424 and pressing a "Delete Class" button 451.

1.3 Generation of Defect Classifier 120 (loop 304)

The steps for incorporating a user-specified classification standard (a set of the above-mentioned five classes) into the system shown in FIG. 1 will now be described. This is accomplished by performing the above five steps (steps 305 through 309) as needed and formulating the entire defect classifier 120 while evaluating the results of the performed steps as needed. All or part of these processing steps can be automatically completed, for instance, by means of learning. At an early learning stage, however, the human should determine the matter which the human can perform setup as much as possible for the purpose of reducing the learning load on the system for effective results. Next, the above five steps (steps 305 through 309) will be described individually in detail.

1.3.1 Specifying a Defect Class Decision Tree (step 305)

Figure 5:
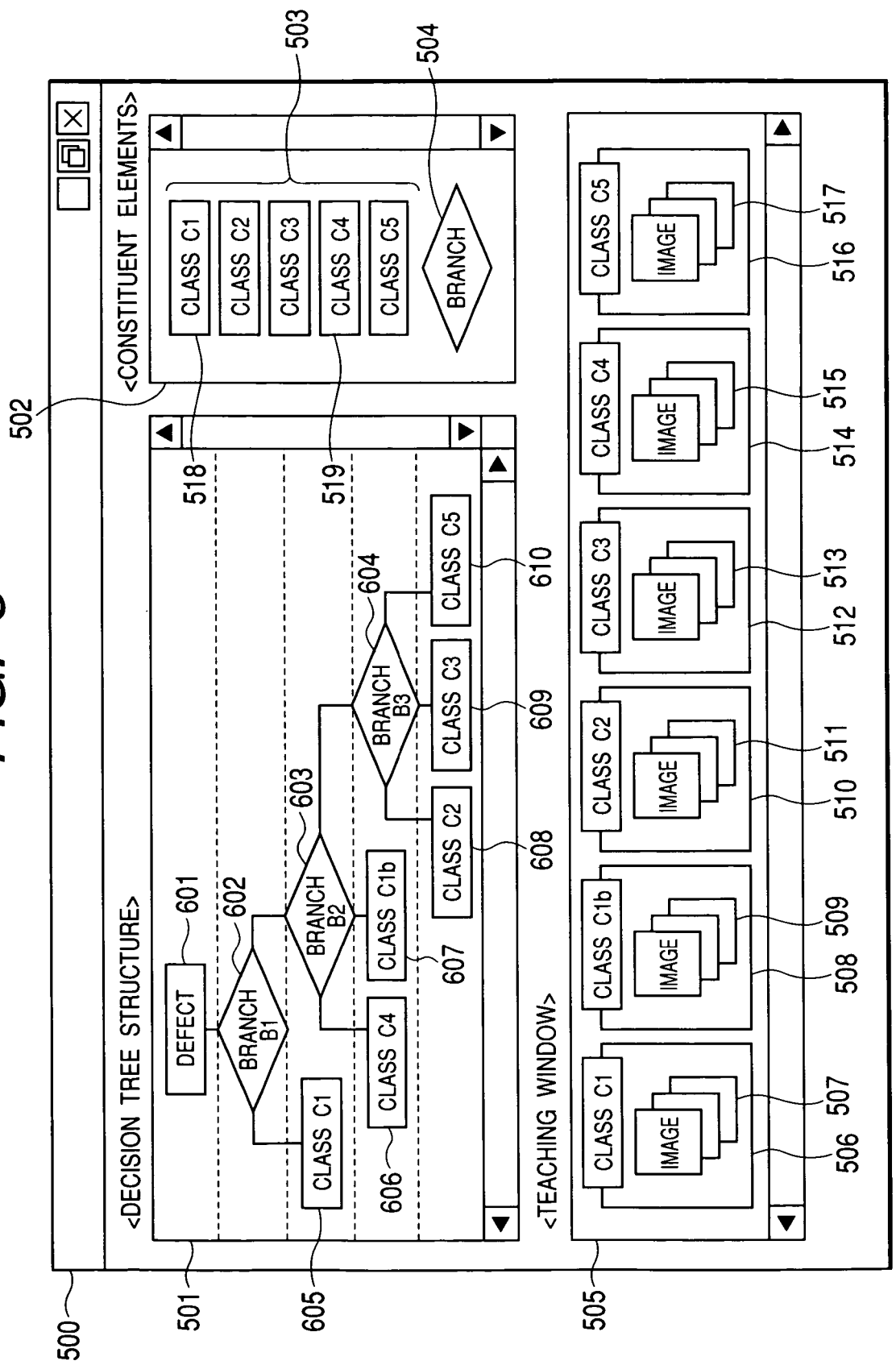
FIG. 5 shows a window that provides decision tree structure setup and defect sample teaching in accordance with one embodiment of the present invention.

A method for specifying a defect class decision tree in step 305 will now be described with reference to FIG. 5. FIG. 5 shows a window that performs setup of a hierarchical decision tree structure and provides defect sample teaching in accordance with one embodiment of the present invention.

In the present embodiment, the decision tree indicates a branching procedure for achieving final defect classification as specified in window 424 shown in FIG. 4. It comprises "class elements (classification class elements)" and "branch elements". Pressing a "Specify Teaching Sample/Determine Class-Branch Configuration" button 452 opens window 500, which is shown in FIG. 5. Window 500 can be displayed and manipulated simultaneously with window 400. Further, windows 400 and 500 can be displayed within the same window. When the defect classes are specified within window 424, class elements 503, the number of which is equal to that of defect classes composing a classification decision tree, are created within window 502. Further, a branch element 504 which composes a classification decision tree is prepared by default. These elements are used to specify the decision tree configuration within window 501. In window 501, which is shown in FIG. 5, an example of a completed decision tree is indicated. Such a decision tree is created as indicated in FIGS. 6(a) through 6(c).

Figure 6A:
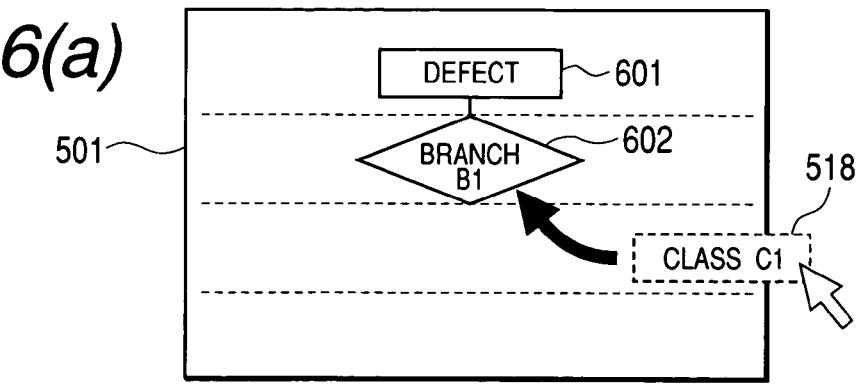
FIGS. 6(a), 6(b), and 6(c) illustrate the setup procedures for a decision tree structure shown in FIG. 5 in accordance with one embodiment of the present invention.
Figure 6B:
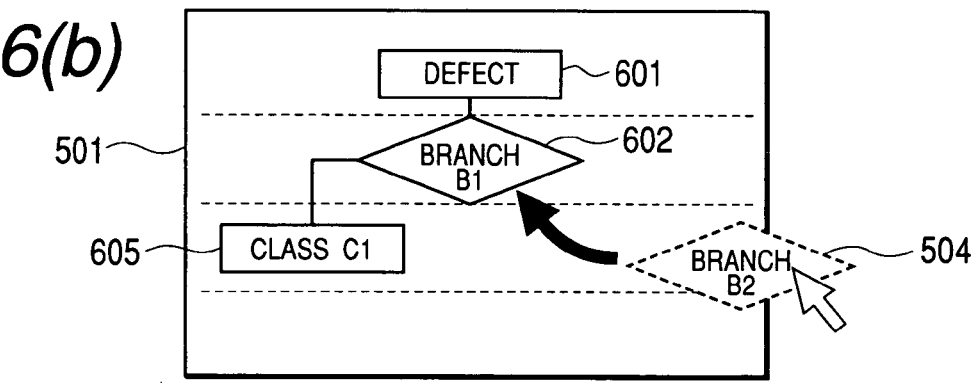
Figure 6C:
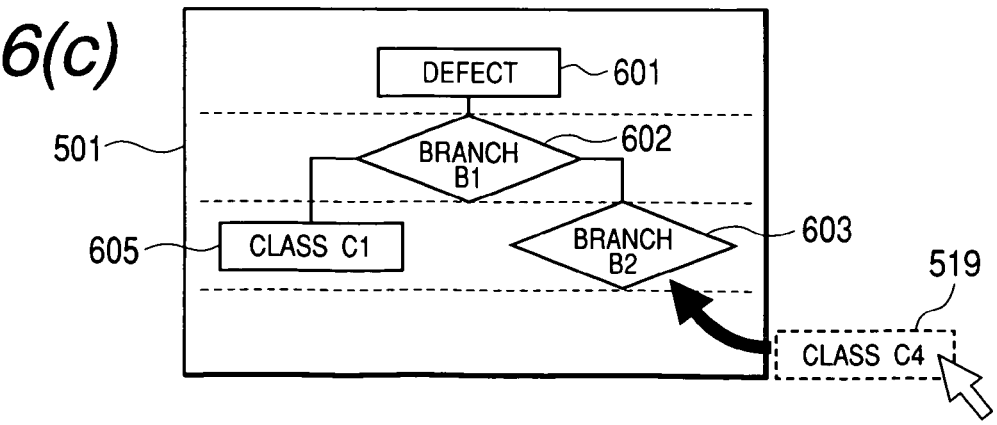

FIGS. 6(a) through 6(c) illustrate the setup procedures for a hierarchically expandable decision tree structure shown in FIG. 5 in accordance with one embodiment of the present invention. FIG. 6(a) shows a case where a first branch is used for branching defect class. FIG. 6(b) shows a case where the next branch is attached to the first branch. FIG. 6(c) shows a case where the second branch is used for branching defect class.

First of all, the classification start point 601 and the first branch B1 602 are displayed by default as shown in FIG. 6(a). When the first branch B1 is to be used to branch defect class C1, class element 518 having a defect class C1 label is dragged from window 502 and dropped into branch B1 602 as shown in FIG. 5. A copy 605 of class element 518 is then displayed under branch B1 602 as shown in FIG. 6(b). When a branch is to be provided in parallel with class element 605, branch element 504 is dragged from window 502 shown in FIG. 5 and dropped into branch B1 602. Branch element B2 603, which is a copy of branch element 504, is then displayed under branch B1 602 as shown in FIG. 6(c).

Each time a branch element is copied, it is assigned a serial ID either automatically or manually (e.g., branch B1, B2, and so on) for identification purposes. When branch B2 is to be used to branch defect class C4, a class element 519 having a defect class C4 label is similarly dragged and dropped into branch B2 603. The hierarchically expandable decision tree comprising the class elements and branch elements can be arbitrarily configured in accordance with the following conditions:

(1) A layer directly under the classification start point 601 contains only one branch element.

(2) Any number of class elements and branch elements can be added to a layer directly under a branch element.

(3) Nothing can be added to a layer directly under a class element.

(4) Any number of the same class elements can be added to a layer directly under different branch elements.

Each time a branch element is added, a branch label is added to window 426 (see FIG. 4), which displays a list of branches. Defect classes or branches belonging to an added branch are displayed on the right-hand side. They are color-identified or otherwise marked for identification purposes and displayed together with a label. For example, branch element B2 603 is branched into defect class C4 606, C1b 607, and branch B3 604. In the description 427 of branch B2 within window 426, therefore, a label 448 for branch B2 and frames and labels 449 corresponding to three defect classes or branches belonging to branch B2 are displayed.

As regards the above combination condition (4), for example, class elements 605 and 607 for the same defect classes C1 and C1b can be attached to a layer directly under branch elements B1 and B2, respectively as shown in FIG. 5. In this case, the defect classification result is later integrated. In a situation where a plurality of the same class elements are created, serial IDs are either automatically or manually assigned (e.g., defect classes C1, C1b, C1c, and so on) for identification purposes each time a copy is made. Further, whenever the same class element is copied, the label for the copied defect class is added to window 425.

As described above, when the decision tree, which classifies defects by expanding them hierarchically or stepwise, is structured so that branch B1 602 is used to branch defect class C1 and the remaining defect class, and that branch B2 603 is used to branch defect class C4, defect class C1b, and the remaining defect class, and further that branch B3 604 is used to branch defect class C2, defect class C3, and defect class C5, the classification standard complying with a user request can be established easily, quickly, and properly.

1.3.2 Defect Sample Teaching (step 306)

The method for defect sample teaching in step 306 will now be described. First of all, window 500 opens as shown in FIG. 5. When defect classes are specified within window 424, which is shown in FIG. 4, frames are created within window 505. The number of created frames corresponds to the number of specified defect classes. In FIG. 5, six defect class frames are displayed. However, frame 508 does not exist until a copy C1b of defect class C1 is made.

If one or more defect samples are to be selected from a defect distribution map (408 or 409) or image display window (402 or 403) and taught as defect class C1, image teaching to individual defect classes is conducted by dragging and dropping the images of the defect samples into a frame 506 that corresponds to defect class C1.

Teaching to the other defect classes can also be conducted by sending the images of defect samples into the frames of respective defect classes in the same manner as above. Provision (existence) of teaching, including the number of images, need not be standardized for all defect classes. Further, an image of the same defect sample can be taught into a plurality of defect class frames. Teaching sample images fed from different types of defect inspection machines can be taught as different teaching samples even when the fed sample images present defect samples of the same defect location (these images can be separately displayed when a distribution of various defect attributes is displayed as described later).

Further, each time a copy of the same defect class element is made in window 501, a frame for the copied defect class is newly created within window 505 as described earlier. For example, frames 506 and 508 exist for class elements 605 and 607, which relate respectively to defect class C1 and defect class C1b which is a copy of defect class C1. Both the same defect samples (sample group) and different defect samples (sample group) can be taught to such frames.

1.3.3 Degree-of-Separation Evaluation of a Defect Attribute Distribution (step 307)

As regards the method for determining the classification rules (comprising the class elements and branch elements created according to the above rules) for the branches of the hierarchically expanded decision tree, a method for visualizing or evaluating the degree of separation of attributes will now be described (step 307). For this operation, the whole decision tree need not be completed. All the defect samples need not be taught. It is possible to change the configuration of the decision tree and the teaching pattern for the defect samples. However, the subsequent explanation assumes that decision tree construction and defect sample teaching are both completed as indicated in window 501, which is within window 500 in FIG. 5.

First of all, a branch to which a classification rule is to be assigned is selected from window 426, which displays a list of branches shown in FIG. 4. If, for instance, branch B2 427 is selected, a defect attribute distribution window 454 displays the distribution of various attributes for the three defect classes and branches (C4, C1b, and B3) (these defect classes and branches are collectively referred to as categories) that are separated at branch B2 while identifying the three defect classes and branches by a color identification or other method (459, 460, etc.).

In FIG. 4, white, dotted, and diagonally hatched portions are used instead of color identification. As a matter of course, it is assumed that the feature amounts of defect samples, used for creating a defect classifier 120, in defect distribution maps 408 and 409 are calculated in step 203, which is shown in FIG. 2. Therefore, when a teaching defect sample image in defect class C4 is taught in frame 514 and a teaching defect sample image in defect class C1b is taught in frame 508, it is possible, at branch B2, to discriminatingly display feature amount distributions of teaching defect samples for two defect classes C4, C1b from the feature amount distribution of the whole sample excluding defect class C1 because the feature amounts of these teaching defect samples are calculated.

The three defect samples corresponding to the above three defect classes and branch (three categories), which are color-identified when displayed, are "defect samples 515 that are taught as defect class C4", "defect samples 509 that are taught as defect class C1b", and "defect samples 511, 513, and 517 that are taught as defect classes C2, C3, and C5, which are in a layer beneath branch B3". When these various attribute distributions are displayed, they are divided into separate windows (455 and 456) in accordance with each defect inspection machine that acquired each teaching sample image (they can also be displayed together).

A list of various attribute distributions displayed in window 454 includes not only image feature amounts (amounts of quantified features such as hue (texture, etc.), size (area or length), shape (foreign matter shape, scratch shape, etc.), and positional relationship of a defect to a wiring pattern (positional relationship indicated by a short, open, or other fatal defect) derived from various defect images) but also distributions (e.g., frequency distribution) which evaluated (quantified) defect classification results produced by different types of defect inspection machines (the result of whether arbitrary defect sample is classified into which defect class), composition analysis results (the result of whether arbitrary defect sample is combination of what compositions), and defect map distributions.

When a specified procedure is performed after pressing an "Add Defect Attribute" button 422, window 454 makes it possible to add a prepared attribute or design and add a new attribute. It is also possible to delete an attribute. As described earlier, decision tree determination and defect sample teaching need not be completed. Only the specified portions will be reflected in various attribute distributions. As shown in FIG. 4, the attributes effective for classification at a specified branch are clarified when defect sample attribute distributions taught to a layer under the above defect class or branch are displayed in such a manner as to indicate differences for each defect class or branch (category) for classification at the specified branch.

To display various attribute distributions, the use of histogram 459 or 460 is conceivable. However, the present invention is not limited to the use of such a display method. When a two-dimensional or three-dimensional distribution display or other similar method, which, for instance, involves a combination of arbitrary attributes, is applied by pressing an "Attribute Distribution Display Method" button 421, it is possible to select a display method that clearly indicates the degree of attribute separation of each defect class or branch to the user. A concrete example of the above two-dimensional or three-dimensional distribution display method will be given later. The present invention also provides a function of indicating the location of an attribute of a selected defect sample within the entire attribute distribution and its numerical value.

Another function provided by the present invention makes it possible to quantify (evaluate) the degree of separation, as an index for the user's judgment of degree of attribute separation, and display the quantified degree-of-separation value for each attribute as indicated, for instance, by reference numerals 457 and 458. For example, the attribute distribution average value discrepancy and dispersion among defect classes may be used for quantifying the degree of separation.

1.3.4 Classification Rule Selection (step 308)

Step 308 is performed to generate a classification rule that is assigned to each branch. The method for such classification rule generation will now be described. First of all, the branch to which a classification rule is to be assigned is specified from window 426. Branch B2 427 is designated here as an example, and the method for determining a classification rule that is within the system shown in FIG. 1 and for providing classification for defect classes C4 and C1b, which are derived from branch B2, and branch B3 will now be described. (When branch B2 427 is specified, a list of various attribute distributions in window 454 indicates color-identified various attribute distributions for defect classes C4 and C1b and branch B3, as described earlier.) Next, when a "Specify Classification Rule" button 453 is pressed, a classification rule generation window 700 opens as shown in FIG. 7.

Figure 7:
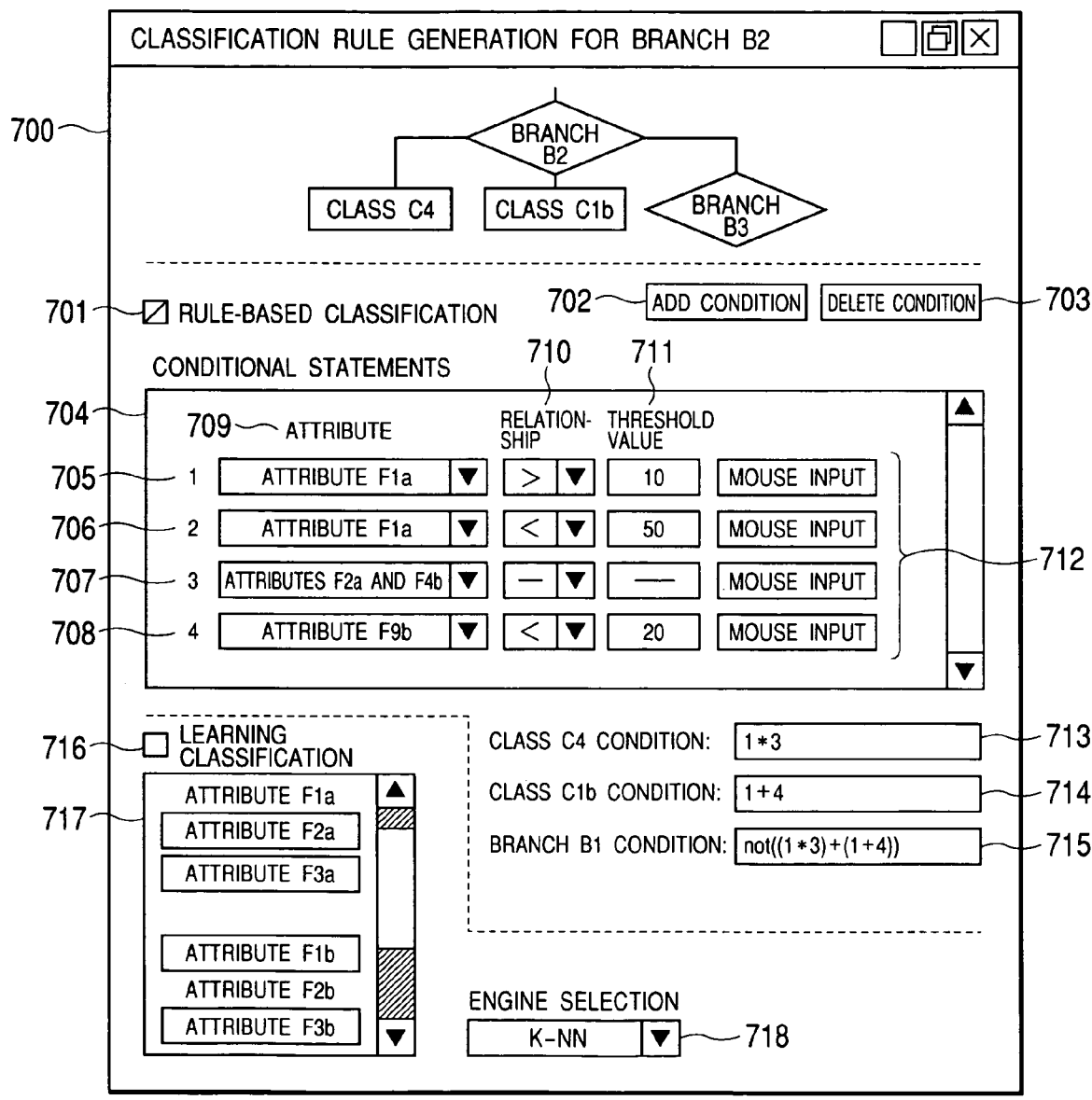
FIG. 7 shows a classification rule setup window for various branches within a decision tree in accordance with one embodiment of the present invention.
Figure 8A:
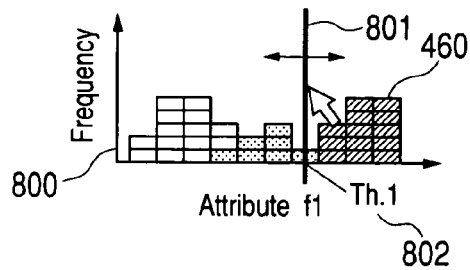
FIGS. 8(a) through 8(f) show multi-dimensional graphical presentations of various attributes and procedures for specifying restrictions conditions (limitations) within graphs in accordance with one embodiment of the present invention.
Figure 8B:
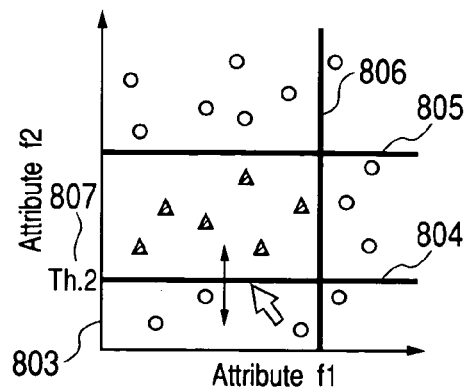
Figure 8C:
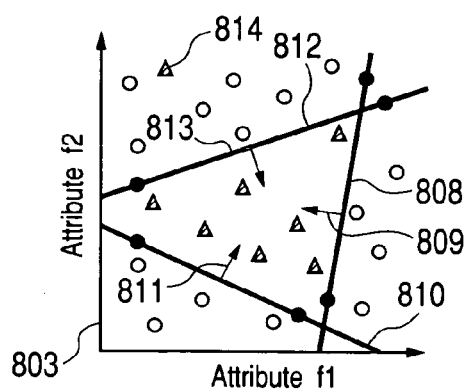
Figure 8D:
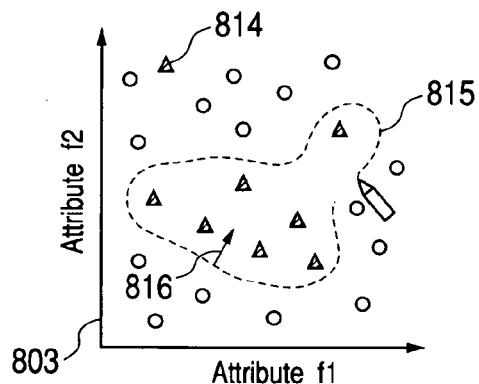
Figure 8E:
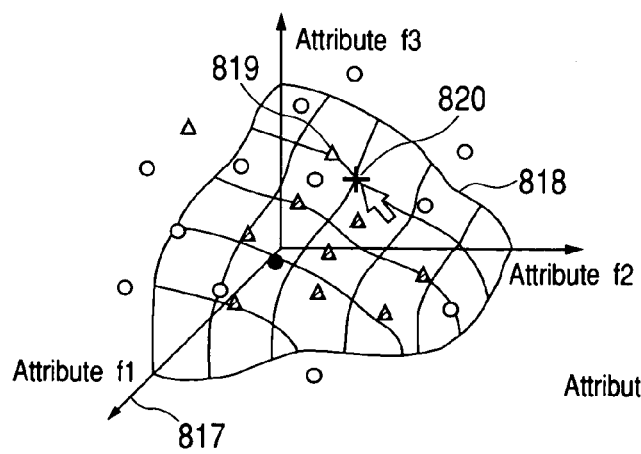
Figure 8F:
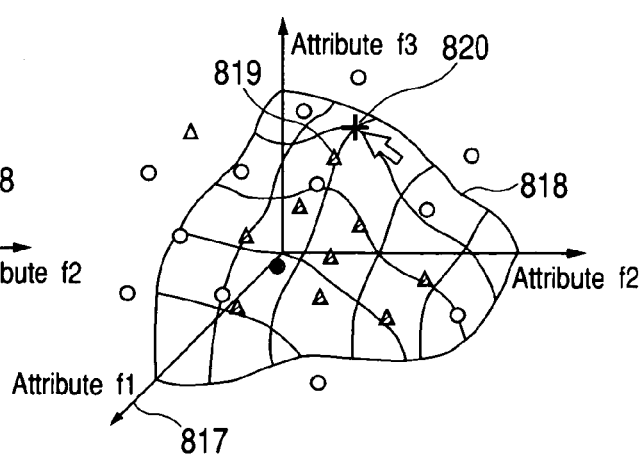

FIG. 7 shows a classification rule generation window for various branches within a decision tree in accordance with one embodiment of the present invention. Window. 700 can be displayed and manipulated simultaneously with windows 400 and 500 (they may be displayed within the same window). Window 700 mainly provides classification rule setup for two types: "rule-based classification" and "learning classification (teaching type classification)". These two types may also be combined for classification rule setup purposes.

If the designer has a knowledge about setting matters (items) comprising of setup of the decision tree, the way of combining rule-based classification and learning classification and parameter of a rule-based classifier and learning classifier, the setting matters can be determined by means of incorporation or manually. If it is anticipated that the designer may not have the above knowledge, the setting matters can be determined by learning. In a situation where an adequate amount of teaching data is not available, for instance, at system startup, excessive learning may occur so as to incur performance deterioration. Therefore, it is important to display defect images and attribute distributions derived from various defect inspection machines and determine the setting matters in accordance with such information wherever possible with a view toward decreasing the degree of freedom for items to be determined during learning.

1.3.4.1 Rule-based Classification

Rule-based classification is method for generating a classification rule by combining predefined conditional expressions (which include items such as the attribute, relationship, and threshold value settings (boundary line or interface)). When rule-based classification is to be conducted, a check box 701 should be first checked.

Next, an example of a conditional expression designation procedure for rule-based classification will be described. First, one or more conditional expressions are added by pressing an "Add Condition" button 702. Three items ("Attribute" 709, "Relationship" 710, and "Threshold Value" 711) are the specified for each conditional expression. In the figure, conditional expressions 1 through 4 705-708 are generated as examples.

As described earlier, a plurality of attributes are already calculated for each defect sample. Therefore, the user selects attributes that have a high degree of separation and are effective in defect classification, and then incorporates them into the conditional expressions. However, attributes having a high degree of separation for a teaching sample are not always effective attributes for classification. Therefore, the user should judge whether the attributes are effective in classification. It should also be noted that the rule can be modified in accordance with subsequent additional learning.

As described earlier, the degree of separation can be judged in accordance with a list of various attribute distributions (histograms and two- or three-dimensional data) shown in window 454 and quantified degree-of-separation values (indicated, for instance, by reference numerals 457 and 458). For example, an "Attribute" 709 selection is made from a pull-down menu. A plurality of attributes can also be selected.

(1) When one attribute is selected from "Attribute" 709, the remaining "Relationship" 710 and "Threshold Value" 711 are to be set. For "Relationship" 710, an inequality sign ($>$, $\geq$, $=$, $\leq$, $<$) should be selected, for instance, from a pull-down menu. For "Threshold Value" 711, a numerical value should be entered from a keyboard (not shown). As regards "Threshold Value" 711 setup, a value can be sensuously entered from a separate window using an interface such as a mouse or tablet after pressing a "Mouse Input" button 712, which is displayed to the right of a condition field. Explanation will be given with reference to FIG. 8.

FIGS. 8(*a*) through 8(*f*) show multi-dimensional graphical presentations of various attributes and procedures for specifying limitations within graphs in accordance with one embodiment of the present invention. In graph 800 for frequency for attribute f1 shown in FIG. 8(*a*), for example, boundary line 801 within the histogram can be moved horizontally with a mouse to determine threshold value Th. 1802 for attribute f1 and the determined threshold value can be substituted into the "Threshold" 711 field shown in FIG. 7. Further, when attributes f1 and f2 are simultaneously drawn with a two-dimensional graph as shown in FIG. 8(*b*), threshold value Th. 2 807 can be set by moving boundary line 804 for, for instance, attribute f2 while grasping the overall tendency. In this example, two-class linear separation (attribute distributions of samples belonging to classes are indicated with circles and triangles in FIG. 8(*b*)) can be achieved from three conditional expressions based on boundary lines 804 through 806.

(2) When two or more attributes are selected from "Attribute" 709, the remaining "Relationship" 710 and "Threshold Value" 711 fields are not readily filled out for setup purposes. Therefore, such fields are left blank and a separate window is used for setup after pressing the "Mouse Input" button 712.

When, for instance, two attributes are selected, it is conceivable that a two-dimensional graph about selected attributes (f1 and f2) may appear on screen. A plurality of boundary lines can be designated on the presumption that two classes, which are indicated by white circles and black triangles, are used for classification purposes.

As regards the boundary lines, straight lines (808, 810, and 812) are first determined by specifying two points, for instance, within a two-dimensional graph, and then arrow marks (809, 811, and 813) are used to specify the direction, thereby indicating which of the regions produced by division by the straight lines is to be subjected to setup. The boundary lines can be specified by straight lines or line segments. As the final condition setup, the conditions specified by a plurality of boundary lines are either ANDed or ORed.

Due to the characteristics of attribute distributions, a teaching sample may sometimes include an exceptional defect sample (e.g., defect sample. 814). The user determines whether or not to include such a defect sample within a boundary line. In FIG. 8(*c*), defect sample 814 is excluded from a black triangle class.

As indicated in FIG. 8(*d*), it is also possible to provide a function of drawing a curve 815 freely with a mouse and use an arrow mark to specify the conditions.

When three attributes are selected, it is conceivable that a three-dimensional graph about attributes f1, f2, and f3 may appear on screen as shown in FIG. 8(*e*). For using two classes indicated by circles and triangles for classification purposes, the attribute space can be divided with a plurality of identification planes (discrimination curves) that are approximated by a set of spline surface or other curved surface patches or plane patches. The three-dimensional attribute space expressed on a two-dimensional screen surface can be displayed with the view point changed. Further, another function is incorporated for displaying color-identified regions, which are divided by an identification curved surface (a discrimination curve) to facilitate the user's understanding.

In FIG. 8(*e*), all defect samples are color-identified (in white or black) depending on which of two regions, which are divided by an identification curved surface, they belong to. In the present example, the identification curved surface is considered to be satisfactory when color identification is provided so that circular defect samples are in white and that triangular defect samples are in black.

A typical method for adjusting the identification curved surface will now be described. Since defect sample 819 belongs to a triangular defect class, it should be in black for color identification purposes. However, it is in white for color identification purposes. In order to move it to the opposite side of the identification surface and display it in black for color identification purposes, arbitrary point 820 on the curved surface is moved (or an arbitrary control point, which does not exist on the curved surface, may be moved) so as to locally deform the identification curved surface across defect sample 819. In FIG. 8(*f*), defect sample 819 is in black for color identification purposes. When this adjustment process is repeatedly performed, a satisfactory identification surface can be generated. It should also be noted that the degree of freedom can be set as desired for the identification curved surface.

Next, the above procedure is performed to combine specified conditions 1 through 4 705-708 and set a final conditional expression, which belongs to each defect class. For condition combination, a logical expression (AND (*), OR (+), NOT (not) or XOR (xor)) is used. If, for instance, conditions 1 and 3 are to be ANDed as a condition for defect class C4, "1*3" is written in field 713. An additional function is incorporated for calculating and displaying a candidate for a boundary line/ identification surface that is calculated as a reference value by the system's aforementioned internal process. The user can use such a value as an initial value and make fine adjustments. The information about set boundary lines/identification surfaces is stored inside and can be later recalled for modification.

1.3.4.2 Learning Classification (Teaching Type Classification)

Learning classification (supervised classification) is a classification method that basically generates a classification rule in accordance with teaching. Even when an attribute effective in classification exists, the learning classification method is effective in attributes for which condition setup cannot easily be performed as is the case with rule-based classification. When a classification rule of this type is to be adopted, check box 716 shown in FIG. 7 is checked. Next, a plurality of attributes are selected for use with a learning type engine. The attributes can be selected either manually or automatically. For automatic selection, each attribute is weighted upon learning in accordance with its degree of effectiveness. However, automatic attribute selection may incur excessive learning if the number of available learning samples is insufficient. It is also probable that only the attribute distribution of learning samples may have a high degree of separation. Therefore, a function of combining manual attribute selection and learning is incorporated.

Next, a pull-down menu 718 is used to select an engine (maximum likelihood estimation method, K-NN method, etc.) for use in classification. The menu also provides an automatic selection mode so that an appropriate engine can be automatically selected in accordance with the number of learning samples. This engine is basically applied to a case where a conditional engine is not used or to a defect sample for which no defect class is determined by a conditional engine. As an alternative configuration, however, two branches can be joined together within window 501, which is shown in FIG. 5, so as to use the upper level as a learning type and the lower level as a conditional type.

Various attributes are used, for instance, for attribute distribution display and decision tree/classification rule generation. A plurality of such attributes can be subjected to a combination of one or more of an attribute orthogonalization process based, for instance, on principal component analysis, an attribute dimension count compression process based on orthogonalized high order principal components only, and an attribute distribution reallocation process to be performed on an attribute space using a kernel function or the like (a process in which the attributes of defect samples belonging to different defect classes exhibit a high degree of separation in the attribute space). A function is incorporated for adding such a redesigned attribute as a new attribute to window 454, which is shown in FIG. 4, and making them available as is the case with the other attributes.

Combining the above three processes creates an advantage that defect classification can be achieved with an identification surface (a discrimination surface) that is simpler and clearer. However, the physical meaning of an attribute is generally complicated. When the defect attribute distribution display function and decision tree/classification rule determination method according to the present invention are used, it is possible to generate an acceptable defect classifier 120 without the knowledge about the physical meaning of attributes.

1.3.5 Classification Result Evaluation (step 309)

In step 309, the generated defect classifier according to the present invention is evaluated. The method for evaluating such a defect classifier will now be described. This evaluation can be made even if the classification decision tree is not fully completed. When a "Reclassify" button 423 shown in FIG. 4 is pressed after setting a classification rule for a branch, the defect classification based on the branch appears in a wafer map 420. If the result is not satisfactory, the teaching sample, decision tree structure, and classification rule are corrected as needed. If the result is satisfactory, on the other hand, the remaining classification rules are specified. The defect classifier 120 according to the present invention is wholly determined by repeating the loop 304 shown in FIG. 3 multiple times.

When all the decision trees and classification rules are determined, the conditions for step 310 are satisfied and then the process ends. Further, the check boxes 414, 415 shown in FIG. 4 are used to specify what defect inspection machines use the generated defect classifier 120 according to the present invention. In the present embodiment, the defect classifier is used for defect review machine B.

Second Embodiment

Generation of a Defect Classifier 120 According to the Present Invention in a Defect Review Machine The second embodiment will now be described. The method of generating the defect classifier 120 according to the present invention for one defect inspection machine has been described in conjunction with the first embodiment. However, when a combination inspection is conducted with a plurality of defect inspection machines, it is necessary to determine what classification classes are to be assigned for each defect inspection machine and determine the method of generating the defect classifier 120 according to the present invention, which realizes defect classification for each defect inspection machine. If, for instance, defect classes that cannot be handled by the defect detection machine can be subjected to fine classification by the defect review machine to accomplish hierarchical defect classification in a situation where a defect detection machine and defect review machine are combined for inspection purposes, the number of defect classes for the defect review machine's classification can be decreased to permit the defect classifier to learn effectively. However, the defect classification standards for both defect inspection machines are set up on an individual basis. The hierarchical defect classes assigned to them are not based on a unified classification standard. Therefore, the present invention provides the method for generating defect classes and defect classifier in order to conduct hierarchical defect classification in accordance with the inspection sequence.

The method for generating defect classes and defect classifier in accordance with the present invention is also effective for review sampling plan control. For example, if new useful information on defect classification cannot readily be obtained when the defect review machine is used to conduct an analysis of a defect sample that is already classified as a certain defect class by the defect detection machine, it is possible to use a method for reducing the number of review samples.

The present embodiment assumes that defects are already detected by a defect detection machine. The following description describes the method of combining the inspection information derived from both the defect detection machine and a defect review machine and generating defect classes and defect classifier for achieving effective, fine, automatic defect classification so as to fulfill the user's classification request.

The defect sample inspected by the defect review machine is a set that is sampled from defect samples inspected by the defect detection machine. Therefore, the inspection information derived from both the defect detection machine and defect review machine can be used in relation to all defect samples to be subjected to defect classification by the defect review machine.

2.1 Processing Flow

The subsequent description relates particularly to an analysis method that is used when one defect detection machine is combined with one defect review machine. However, the same analysis method can be applied to a situation where three or more units of defect inspection machines are combined (this will be described in conjunction with the fifth embodiment). Even if a combination other than a combination of a defect detection machine and defect review machine is used, the same analysis method can also be applied as far as the common defect samples are used. Defect distribution maps 901 through 903 in FIG. 9 exemplify the defect sample distributions in defect distribution maps and defect classification results at various processing stages.

(1) After completion of a predetermined process for semiconductor device manufacture, an inspection is first conducted by the defect detection machine. The inspection information derived from this inspection is forwarded to the data server 107 or processing terminal unit 108 as needed. Defect distribution map 901 exemplifies a defect sample distribution in the defect detection machine and the coarse defect classification result (unadjusted) produced by the defect detection machine's defect classification. Defect samples at 21 points are classified into defect classes Ca1 through Ca3. However, defect classification is not mandatory in this step.

(2) Defect samples (defect sample group) detected in step 901 are sampled for review inspection as needed (this is called "review sampling").

(3) The review-sampled defect samples are inspected by the defect review machine. However, the process for semiconductor device manufacture to be reviewed here need not be identical with the process that was inspected in step 901. The inspection information obtained here is forwarded as needed to the data server 107 or processing terminal unit 108.

(4) In accordance with the inspection information that the defect detection machine and defect review machine obtained in steps (1) and (2) above, the determination of defect classes and the generation of the defect classifier for the defect review machine are performed. Since the inspection information derived from both the defect detection machine and defect review machine is used, it is possible to achieve defect classification that cannot be accomplished by the defect review machine alone.

Defect distribution map 902 exemplifies a fine classification result (unadjusted), which is derived from automatic defect classification that is conducted using only the inspection locations used by the defect review machine and the inspection information produced by the defect review machine. Review sampling is conducted so that defect samples at 21 points are reduced to defect samples at 9 points, which are then classified into four defect classes (Cb1 through Cb4) as indicated in the figure. Defect samples da1 and da2 in defect distribution map 901 are classified into different defect classes (Ca2 and Ca3). However, defect samples db1 and db2 in defect distribution map 902, which correspond to defect samples da1 and da2, are classified as the same defect class (Cb3). On the contrary, there are some other cases where corresponding defect samples are classified as the same defect class within defect distribution map 901 but classified into different defect classes within defect distribution map 902.

Although there are classification result inconsistencies between the defect inspection machines, the above defect samples can be classified as the same class or finely sorted when the inspection information derived from both inspection machines is used for defect classification. Defect distribution map 903 exemplifies the result of fine defect classification (adjusted), which is based on the inspection information derived from defect distribution maps 901 and 902 and optimized in compliance with the user's classification request. The resulting example indicates that a defect classifier for fine sorting is employed for defect samples da1 (db1) and da2 (db2) (defect samples db3 and db4 are classified into defect classes Cb5 and Cb3, respectively), and that defects are classified into five defect classes (Cb1 through Cb5).

The procedure for generating defect classes and defect classifier according to the second embodiment can be the same as for the first embodiment. However, the second embodiment is capable of generating a defect classifier according to the present invention in accordance with the attribute information that is derived from the defect detection machine and defect review machine, which are shown in windows 455 and 456 in FIG. 4.

When the above procedure is followed, the setup process in the defect review machine for the defect classifier according to the present invention terminates. Once the defect classifier is generated, it is continuously used for subsequent wafer inspections. However, it is possible to continuously change the defect classifier or provide additional learning in accordance with subsequently obtained inspection information.

2.2 Image Processing Procedure Change or Image Processing Parameter Adjustment

When the inspection information is integrated for use with defect inspection machines, the inspection information inconsistencies between the defect inspection machines may become a problem. Such inconsistencies may cause defect attribute discrepancies among a plurality of defect inspection machines. The discrepancies may occur in defect attributes such as a wiring area recognition result concerning the same defect sample, positional relationship (isolated, single line, or crossed) between defect and wiring areas, defect size or height, and vertical relationship between a defect and film (above or below film). A method for correcting such inconsistencies will now be described.

Figure 13:
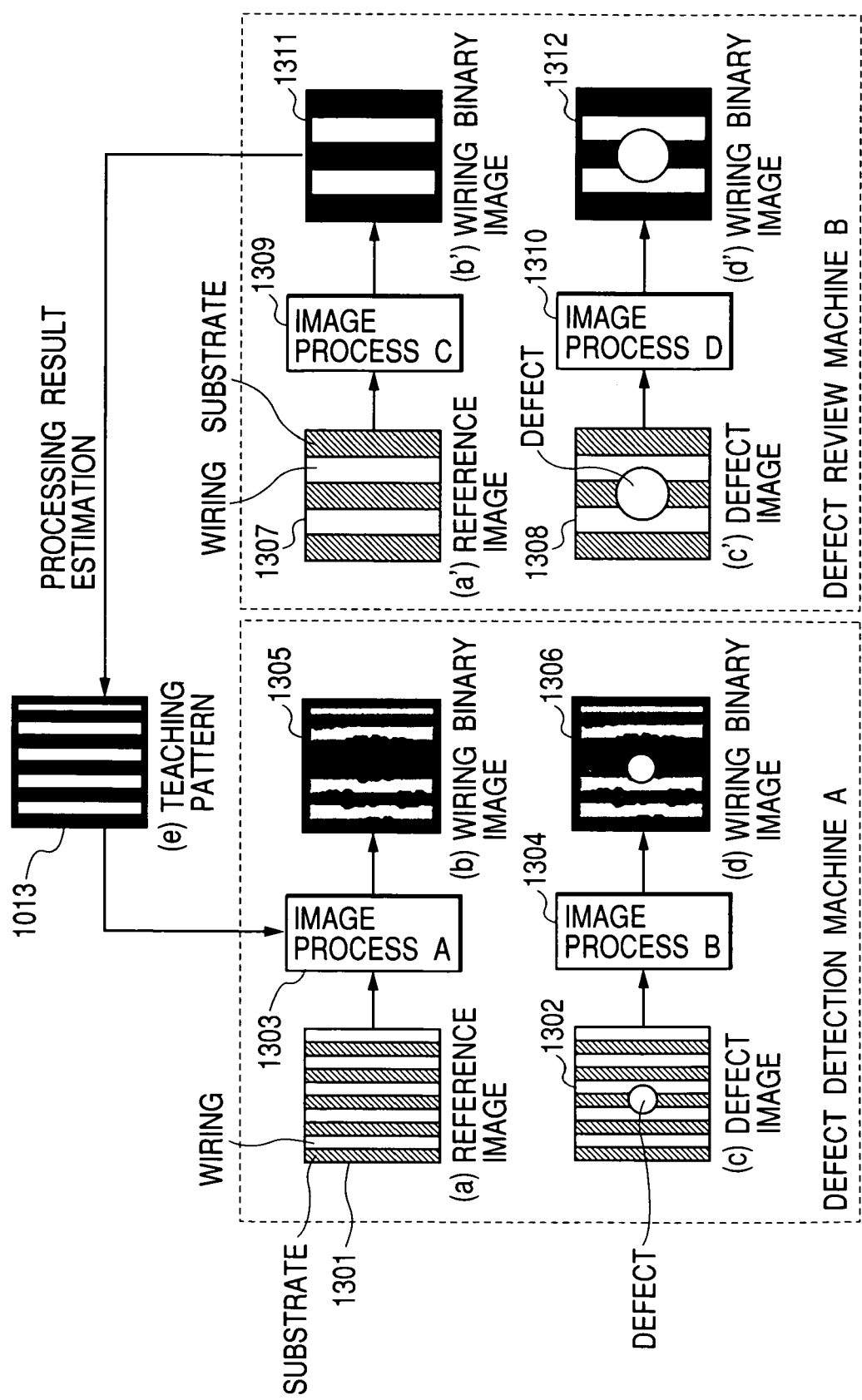
FIG. 13 illustrates a procedure for correcting inspection information inconsistencies between different defect inspection machines in accordance with one embodiment of the present invention.

FIG. 13 shows defect image processing results of the same defect sample, which are derived from defect detection machine (regular defect inspection machine) A and defect review machine B. Inspection images 1301 and 1302 are a reference image and defect image that are picked up in defect detection machine A. Reference image 1301 and defect image 1302 are subjected to image process A 1303 and image process B 1304, respectively. Binary images 1305 and 1306 are obtained respectively by binarizing wiring areas, which are derived from image processing. In binary image 1306, however, the defect area (white circle in the figure) is also binarized for display purposes. Reference numerals 1307 through 1312 correspond to reference numerals 1301 through 1306 and denote the reference image and defect image in defect review machine B, image processes C and D, and binary images, respectively. Binary images 1305 and 1306 indicate a situation where the central wiring is not extracted as a binary area due to wiring recognition failure. The actual defect area represents a highly fatal defect that exists across two wirings. Defect review machine B concludes from binary image 1312 that the defect is isolated. However, defect detection machine A concludes from binary image 1306 that the defect is a break in the wiring. As described above, it is necessary to change the image processing procedure or adjust an image processing parameter in such a manner as to correct defect attribute discrepancies.

Binary image 1311, which is derived from defect review machine B, is then used to perform a magnification change process or a distortion correction process or a luminosity correction or other similar process for a grayscale image for the purpose of generating a teach pattern 1313 as a correct pattern for the wiring binary image in defect detection machine A. Next, the image processing procedure in image process 1303 is changed or the image processing parameter is adjusted so that the processing result matching or similar to the teach pattern 1313 is obtained in binary image 1305. The same thing can be said for the defect image. In the defect image, however, it is conceivable that the defect area may be resized for consistency in addition to the wiring area. Reference image 1301 and defect image 1302 in defect detection machine A, which are used as examples, are inferior to reference image 1307 and defect image 1308 in defect review machine B in contrast and resolution. That is why image processing parameter setup is difficult to perform. When the aforementioned procedure is used, it is possible to correct inspection information inconsistencies among a plurality of inspection machines and set up various image processing parameters that are difficult to set up.

In the present embodiment, defect review machine B is selected as a defect inspection machine that acquires inspection images 1311 and 1312, which generate the teach pattern 1313. The defect inspection machine for generating the teach pattern can be user-specified from the simultaneous review window for various inspection images or automatically specified according to a predefined rule. Further, this process can be performed for all combinations of defect inspection machines.

Third Embodiment

Generation of a Defect Classifier 120 According to the Present Invention in a Defect Detection Machine (Regular Defect Inspection Machine)

The third embodiment will now be described. The following description relates to a method for determining the defect classes in a defect detection machine and the defect classifier as well as a review sampling method, which are to be employed in accordance with the fine inspection result produced by a defect review machine for the purpose of achieving effective defect classification in the defect review machine.

For effective defect classification in the defect review machine, it is preferred that the defect classification standard used in the defect detection machine be similar to the defect classification standard used in the defect review machine. If defect classes that cannot be handled by the defect detection machine can be handled by the defect review machine for hierarchical classification which is fine classification (detailed classification), it is possible to minimize the number of review samples for defect samples that are classified into defect classes in the defect detection machine, which are not subclassified by the review inspection machine. It is also possible to minimize the number of defect classes in the defect review machine, thereby permitting the defect classifier to learn effectively.

The third embodiment assumes that the defect classes used in the defect review machine are known. However, the defect classifier for the defect review machine need not be customized as described in conjunction with the second embodiment. In other words, defect classifier determination for the defect detection machine according to the third embodiment corresponds to defect distribution maps 903 through 905 in FIG. 9. However, the step for defect distribution map 903 may be performed after customization as is the case with defect distribution maps 901 through 903 or without customization.

However, when the defect classifier for the defect review machine is customized as described in conjunction with the second embodiment, customizing the defect classifier for the defect detection machine according to the third embodiment makes it possible to expect that defect class Cb for the defect review machine can be set as a subset of defect class Ca for the defect detection machine or as a set similar to such subset.

The following description assumes that defect classification in the defect review machine and defect classifier customization have been completed. As is the case with the second embodiment, the subsequent description relates particularly to an analysis method that is employed when one defect detection machine is used in combination with one defect review machine. However, the same analysis method can be applied to a situation where three or more units of defect inspection machines are combined.

3.1 Defect Class Determination

To ensure that subsequent defect classification is effectively performed by the defect review machine (second defect inspection machine), the defect classes for the defect detection machine (first defect inspection machine) are set so that they are similar to the defect classes for the defect review machine. In this instance, defect class Cb for the defect review machine (second defect inspection machine) is set so that it is a subset of defect class Ca for the defect detection machine (first defect inspection machine) or is similar to such a subset.

If, for instance, defect classes Cb1 through Cb5 are given for the defect review machine as indicated in defect distribution map 903, only the inspection information derived from the defect detection machine is used to create a defect class teaching pattern for the defect detection machine as defect distribution map 904 in accordance with defect classes Cb1 through Cb5. Next, the defect classifier for the defect detection machine, which provides defect classification that is similar to the teaching pattern, is generated.

The difference from defect classification customization for the defect review machine according to the second embodiment is that the available inspection information is derived from the defect detection machine only and that the inspection information derived from the defect review machine is not available. More specifically, the inspection information available for use with the defect detection machine of interest is limited to the inspection information that is acquired before the use of the defect detection machine of interest within an actual inspection sequence.

To change the defect classifier, it is possible to use the same method as for a defect classier setup method that is described in conjunction with the first embodiment. A defect classifier is generated so that defect classes in defect distribution map 904 which is a teaching classification pattern may be classified as much as possible in the defect detection machine, and the resulting coarse classification result (adjusted) which performed the defect classification using the generated defect classifier is as represented by a defect distribution map 905. In the defect distribution map 905 of the present embodiment, defect classes Ca2 and Ca5 in defect distribution map 904 cannot be properly handled for classification (defect classes Ca2 and Ca5 in defect distribution map 904 are integrated into defect class Ca2 in defect distribution map 905). For the other defect classes (Ca1, Ca3, and Ca4), defect classification is accomplished in a manner similar to the teaching classification pattern 904.

When the above procedure is followed, the defect classifier setup process in the defect detection machine terminates. Once the defect classifier is generated, it is continuously used for subsequent wafer inspections. However, it is possible to continuously change the defect classifier in accordance with subsequently obtained inspection information.

FIG. 11 relates to the defect class determination procedures for both the defect detection and defect review machines shown in defect distribution maps 901 through 905, which are described above, and summarizes the relationship among various defect classes. In tables 1101 through 1103 in FIG. 11, items arranged vertically represent defect classes for the defect detection machine, whereas items arranged horizontally represent defect classes for the defect review machine. The numerals in the cells indicate the number of defect samples in the defect review machine that are classified into various defect classes for the defect detection and defect review machines. The defect class names in the item fields correlate to those in FIG. 9.

Figure 9:
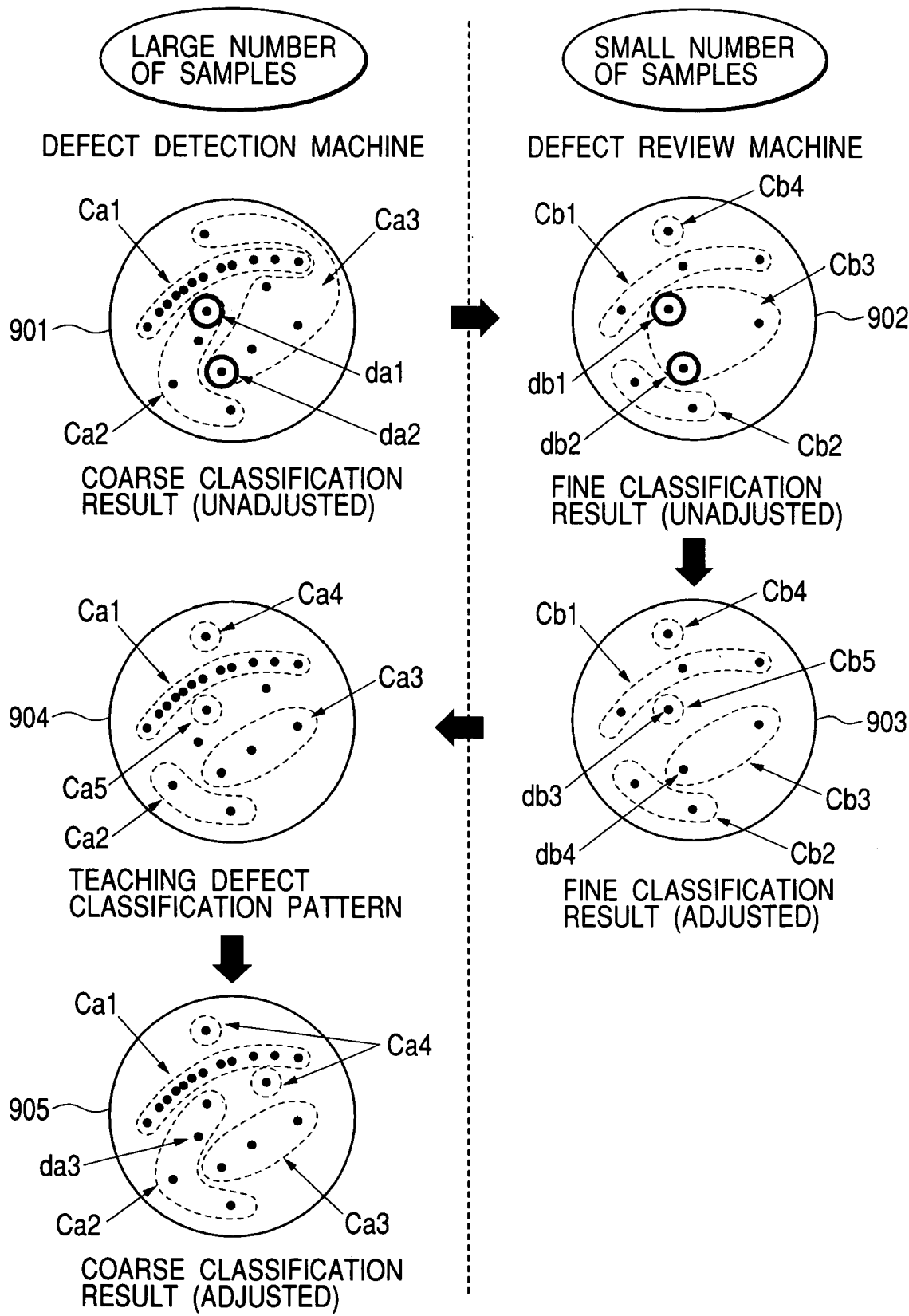
FIG. 9 shows defect distribution maps for illustrating defect sample distributions and automatic defect classification results in various defect classifier generation steps according to one embodiment of the present invention.

① Table 1101 shows defect classes and the inclusive relationship among defect classes for both defect inspection machines that is prevalent before adjustment (corresponds to the relationship between defect distribution maps 901 and 902 in FIG. 9). For example, the area enclosed within frame 1104 indicates that samples classified as defect class Cb3 in the defect review machine are classified as defect class Ca2 or Ca3 in the defect detection machine.

The defect classes for the defect review machine are first adjusted so that defect class Cb in the defect review machine is eventually a subset of defect class Ca in the defect detection machine. For example, the defect classifier is adjusted to sub-classify the defect classes so that two or more defect classes (Ca2, Ca3, etc.) in the defect detection machine do not correspond to one defect class (Cb3) in the defect review machine as indicated within frame 1104. In this instance, in accordance with the user's classification request, deleting any unnecessary defect class, adding a new defect class, or reshuffling a set of defect classes may be performed.

② Table 1102 shows defect classes for the defect review machine, which are adjusted as described above, and their inclusive relationship to unadjusted defect classes for the defect detection machine (corresponds to the relationship between defect distribution maps 901 and 903 in FIG. 9). When this table is compared against table 1101, it is found that defect classes Ca2 and Ca3 are classified as defect class Cb3 in table 1101 whereas only defect class Ca3 is classified as defect class Cb3 in table 1102. If, for instance, there is a request for reviewing many defects belonging to defect class Ca3 in table 1102, effective classification is achieved by increasing the number of reviews of defect samples classified as defect class Ca3 because defect class Ca2 will no longer be a candidate for defect class Ca3.

Next, defect classes Ca for the defect detection machine are adjusted until they are similar to defect classes Cb for the defect review machine. More specifically, the defect classifier is adjusted so that defect classes Cb2 and Cb5 within frame 1105 and defect classes Cb3 and Cb4 within frame 1106 are subclassified. However, the defect detection machine cannot use the inspection information in the defect review machine. Therefore, the defect classification performance of the defect review machine may not be fully delivered to provide adequate classification reliability. If such a situation is anticipated, subclassification is not attempted. A possible alternative would be, for instance, to increase the number of review samples and confirm the result of subclassification.

③ Table 1103 shows the inclusive relationship of defect samples belonging to the defect classes for both defect inspection machines, which are adjusted as described above (corresponds to the relationship between defect distribution maps 903 and 905 in FIG. 9). When this table is compared against table 1102, it is found that defect class Ca3 is divided into defect classes Ca3 and Ca4 in table 1102 so that defect classes Cb3 and Cb4 are classifiable. In the present embodiment, no change is made within frame 1107 as regards the relationship among the defect classes within frame 1105. It is conceivable that classification may be found to be difficult when only the inspection information derived from the defect detection machine is used, or that the above may be done intentionally due to jeopardized classification reliability, which is described earlier. As a result, if attention is paid only on the defect class correspondence, eventual fine classification is achievable when only the defect samples classified as defect class Ca2 in the defect detection machine are subjected to a review inspection. In reality, however, a processing method for increasing the review sampling ratio for defect class Ca2 can be conceived.

Defect class determination can be effectively done by presenting the user the relationship among defect classes for a plurality of defect inspection machines in an easy-to-understand manner. FIG. 11 shows a typical way of presenting the relationship among the defect classes. When the number of defects belonging to each defect class is indicated, it is possible to know how the individual defect classes overlap.

3.2 Review Sampling Method

The method for review sampling will now be described. When defect class Cb for the defect review machine is set to be a subset of defect class Ca for the defect detection machine or similar to such a subset as described earlier, the necessity for review inspection is low for defect samples classified by the defect detection machine into a defect class that is common to the defect detection and defect review machines. On the contrary, the necessity for review inspection is high for defect samples classified as a defect class that is subclassified into subclasses in a review inspection. In other words, it is conceivable that the sampling count is controlled in accordance with the necessity for review inspection.

Defect distribution maps 903 and 905 are examples for explanation. Since the total number of defect samples is extremely small, the overall picture of fine defect classification can be grasped by subjecting only defective point da3 in defect distribution map 905 to review sampling. However, this is not a practical case. In reality, there are quite a large number of defective points and the image quality provided by the defect detection machine is generally inferior to that is provided by a review inspection. Therefore, fine defect classification will not probably be accomplished by the defect detection machine. Further, the results of defect sample classification are not always reliable.

Under such circumstances, it is possible to use a method for conducting several review sampling operations on defect samples classified into every defect classifications, and subjecting defect class Ca2 in defect distribution map 905 (including defect classes Cb2 and Cb5 for the defect review machine) that cannot easily be subdivided in relation to the teaching classification pattern to sampling operations more frequently than the other defect classes, or a method for varying the sampling count in accordance with the defect classification result reliability.

The frequency of review sampling can be determined for each defect class for the defect detection machine as described earlier, for each defect sample, or by considering both the defect classes and defect samples. When the frequency of review sampling is to be determined for each defect sample, effective determination is achieved by checking the defect classification result reliability. As regards the defect classification result reliability, the defect samples can be roughly classified into the following three categories by defining the belongingness to each defect class:

(1) Defects that can be classified as a certain defect class;
(2) Boundary defects having balanced belongingness among a plurality of defect classes (defects that cannot easily be classified); and
(3) Unknown defects that did not exist at the time of learning.

For categories (2) and (3), the necessity for review inspection may be high. For category (1), the necessity for review inspection may be also high if the belongingness to a certain defect class is low. When the defect classes and defect classifier 120 for the defect detection machine are generated as described above and the number of sampling points is controlled according to the defect classes, a hierarchically consistent, effective defect inspection can be conducted in a plurality of inspection machines.

Figure 12:
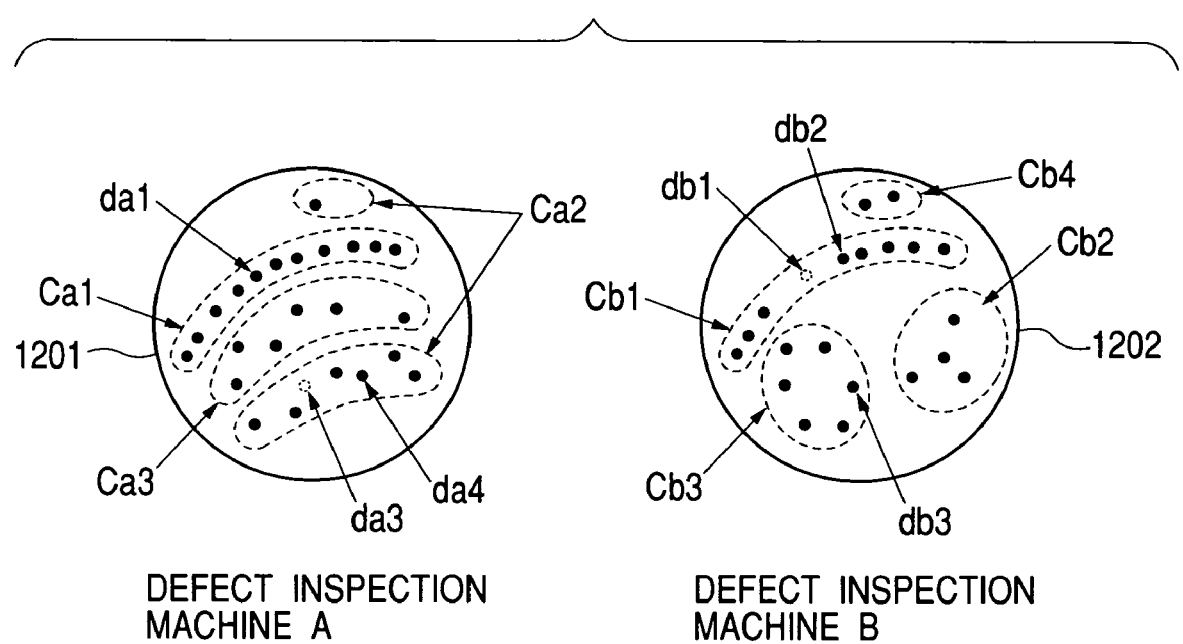
FIG. 12 shows typical cluster distributions that are generated when interpolation is provided to make up for inspection information deficiencies in accordance with one embodiment of the present invention.

In a certain case, however, it may be difficult to set up the defect classifier in such a manner that defect class Cb for the defect review machine is a subset of defect class Ca for the defect detection machine. FIG. 12 shows an example of such a case. In the presented example, the defect classes (Ca1 through Ca3 and Cb1 through Cb4) for defect distribution maps 1201 and 1202, which are provided by defect inspection machines A and B, are not in a subset relationship.

Even in the above case, it is highly probable that a defect sample classified as defect class Ca3 in defect inspection machine A may be classified as defect class Cb2 or Cb3 in defect inspection machine B. It is therefore possible to minimize the number of defect classification candidates for each class. As regards defect samples classified as class Ca3 in defect inspection machine A, therefore, the classification performance can be expected to improve when the defect classifier is set up for defect inspection machine B so as to handle a two-class problem (Cb2 or Cb3) instead of a three-class problem.

Further, the second and third embodiments make it possible to generate the defect classes and defect classifier for the defect detection and defect review machines more or less automatically using a learning function and the like in compliance with the user's final classification request. However, it is highly probable that the defect classes and defect classifier specialized for peculiar characteristics of teaching samples may be generated because adequate teaching samples cannot be obtained particularly at process startup.

In the first embodiment, a method for reviewing detailed inspection information and customizing the defect classifier makes it possible to incorporate the user's request and knowledge concerning defect classification into the system with ease. Thus, a peculiar classification rule can be inhibited. It is also easy to change the defect classifier at an additional learning stage. If, for instance, a teaching sample belonging to defect class Ca contains a large number of round defects whereas a sample belonging to defect class Cb contains a large number of square defects, such a classification rule can be canceled when the difference in shape is not an essential difference between the two classes no matter whether branches related to a shape difference is set by the decision tree. Further, when attribute distribution transitions in a plurality of defect inspection machines are simultaneously observed at an additional learning stage, it is expected that the tendency toward degree-of-separation degradation can be observed in defect classes for attributes that do not relate to essential difference.

Next, a method for using a rate of a fine classification result in case the fine (detailed) classification result of whole defect samples is presumed by carrying out review inspection and carrying but the detailed classification of a part of defect samples detected in defect detection machine, will be described. By conducting detailed inspection about the part of defect samples selected from the defect samples by review sampling, it becomes possible to grasp the rate of the fine classification result included in the part of defect samples. (When each defect class for the defect detection machine is subjected to random sampling, the rate of a fine classification result in each of the defect samples can be determined.)

As regards defect samples that have not been subjected to a review inspection, the inspection information derived from a review inspection cannot be used directly. However, the reliability of presumption can be raised by considering the rate of the fine classification result. If, for instance, the rate of defect classes Ca and Cb are a % and b %, respectively, defect samples are sorted in relation to attributes involved in defect classes Ca and Cb, and a % of samples that are boundary but close to class Ca are classified as defect class Ca.

Fourth Embodiment

The fourth embodiment will now be described. The following description relates to a method for conducting an inspection when defect samples in a plurality of defect inspection machines sharing inspection information cannot wholly reference each other. If the defect inspection machines sharing the inspection information are both defect detection machines, that is, if, for instance, an optical pattern inspection machine and an SEM pattern inspection machine are used in conjunction with each other to achieve defect detection independently, the defect samples detected by the two machines may partly fail to coincide with each other. As regards matching or partially matching defect samples, the present embodiment permits analysis and classification as is the case with the second or third embodiment. The following description particularly relates to an analysis method that is to be employed when two defect detection machines (A and B) are used. However, the same analysis method can be applied to a combination of three or more units of arbitrary defect inspection machines. Even if the employed combination includes a defect inspection machine other than a defect detection machine, the same analysis method can be applied when defect samples do not coincide with each other.

If the inspection information concerning the defect sample to be referenced is not complete, the inspection information concerning a defect sample similar to the target one is used to provide interpolation. The method of such interpolation will now be described.

FIG. 12 shows defect distribution maps 1201 and 1202 to exemplify the respective inspection locations in two defect inspection machines (A and B). This figure is used to consider defect classification concerning defect sample da1 in defect distribution map 1201, which indicates an inspection conducted by defect inspection machine A. It should be noted, however, that defect inspection machine B did not conduct an inspection at coordinates db1 in defect distribution map 1202, which corresponds to defect sample da1. Each defect sample in defect inspection machine B is then subjected to clustering in accordance with spatial defect distribution, defect classification result, or various inspection information. For example, clusters Cb1 through Cb4 are obtained as a result of clustering.

When the degree of spatial belongingness to one of the above clusters can be defined in relation to arbitrary. coordinates in a defect distribution map, the inspection information common or similar to the cluster can be shared within the cluster. For example, the inspection information about defect sample db2, which is considered to belong to the same cluster Cb1 as coordinates db1, can be utilized as the inspection information concerning coordinates db1 in defect distribution map 1202. The other defect samples belonging to the same cluster Cb1 can also be used to achieve inspection information interpolation. However, the inspection information interpolation reliability may be impaired due, for instance, to an incorrect cluster setting, inspection information error at the referencing destination, or inspection information unsteadiness. Therefore, the reliability of inspection information for which interpolation is provided according to various parameters including those on cluster formation reliability, cluster belongingness, and inspection information reliability and unsteadiness can be weighted and used during the use of the inspection information.

Fifth Embodiment

Figure 10A:
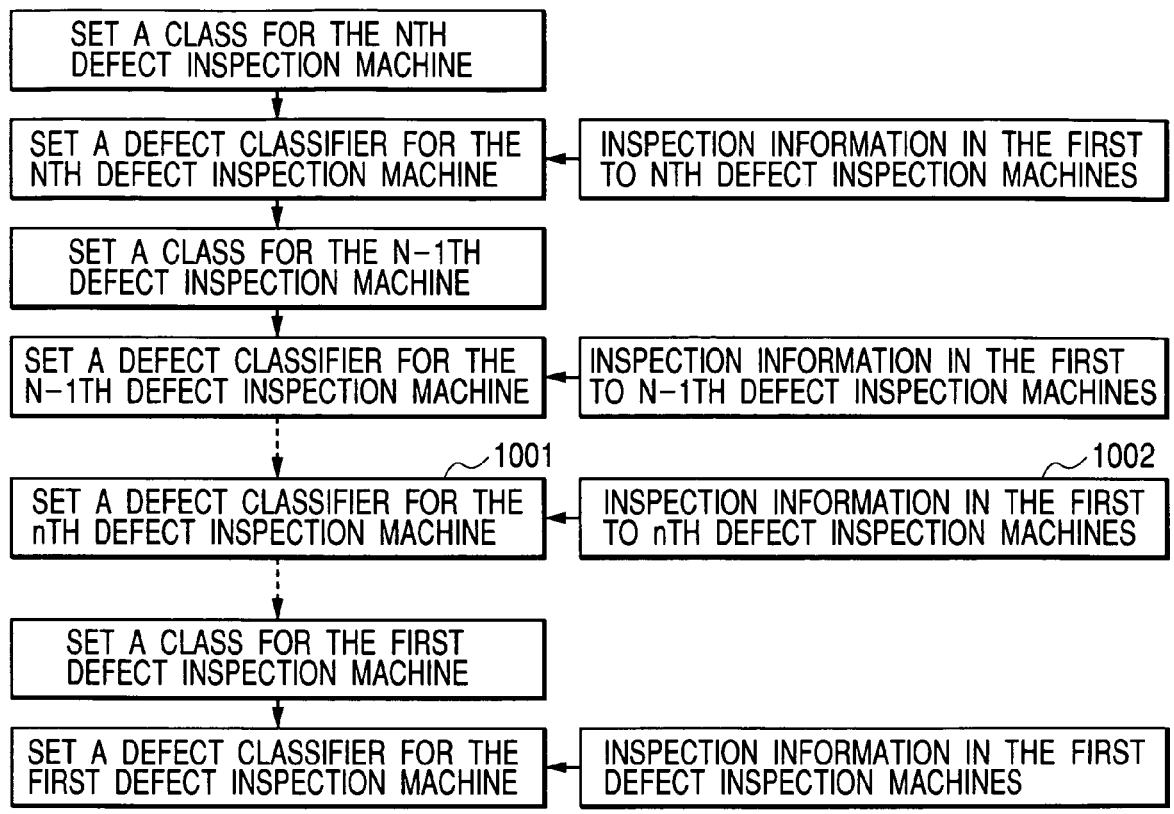
FIGS. 10(a) and 10(b) are flowcharts that illustrate a defect. classifier setup procedure and defect classification procedure, respectively, in accordance with one embodiment of the present invention.
Figure 10B:
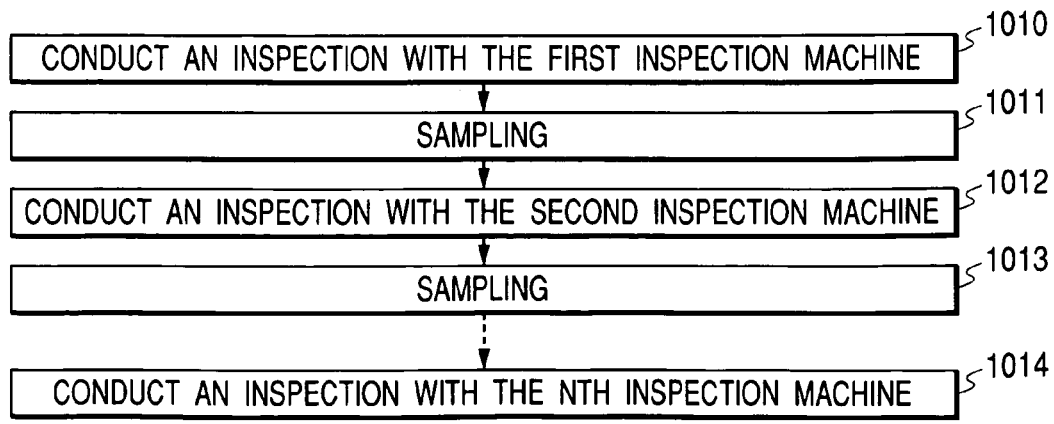

The fifth embodiment will now be described. The following description relates to a situation where three or more units of defect inspection machines are combined to conduct an inspection. The second, third, and fourth embodiments have been described with particular reference to a situation where two units of defect inspection machines are combined to conduct an inspection. However, the analysis method used in the second, third, and fourth embodiments can also be applied to a situation where three or more units of defect inspection machines are combined to conduct an inspection. FIG. 10(*a*) exemplifies a procedure for setting (procedure for generating) the defect classes and defect classifiers for a situation where N units of defect inspection machines are combined to conduct an inspection.

As indicated in FIG. 10(*a*), the defect classes and defect classifier 120 are generated in the reverse order of inspection, that is, in order from the Nth defect inspection machine to the first defect inspection machine. The reason is that interpolation is sequentially provided for defect classification of defect samples, which cannot be classified at all or cannot be classified with adequate reliability, in accordance with the order of inspection. The defect class for the n+1th ($0 \leq n \leq N$) defect inspection machine (second defect inspection machine), which conducts an inspection subsequent to the nth inspection, is determined to be a subset of a defect class for an inspection machine (first defect inspection machine) that conducts the nth inspection or to be similar to such a subset. In other words, the defect class for the Nth defect inspection machine is first generated, and then the defect classes for the N−1th to the first defect inspection machines are sequentially determined so as to limit the defect classes for the subsequent defect inspection machines.

The defect classifier for a defect inspection machine that conducts the nth inspection is generated (step 1001) so as to achieve classification into a defect class for the defect inspection machine that conducts the nth inspection by selectively and collectively incorporating into the classification rule the information available as defect classification judgment criteria, which is among the inspection information 1002 derived from the first to the n−1th defect inspection machines, which conducts earlier inspections. However, it is possible to use the simultaneous review window, which is described in conjunction with the first embodiment, and determine the defect classes and defect classifiers while referencing the inspection information derived from all the defect inspection machines.

Figure 3:
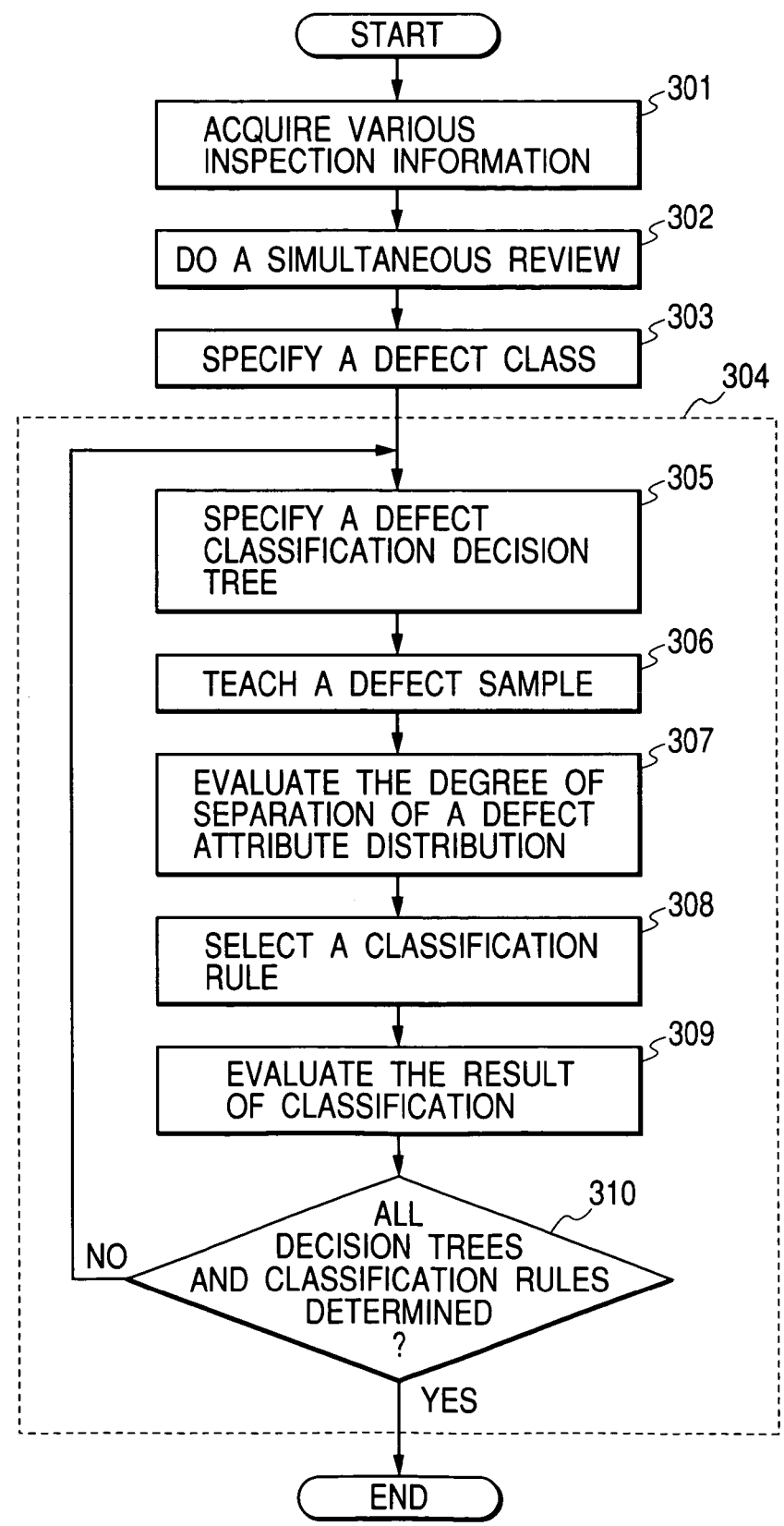
FIG. 3 is a flowchart that illustrates a method of generating a defect classifier in accordance with one embodiment of the present invention.

The defect classes and defect classifiers can be repeatedly corrected as indicated in FIG. 3. Further, any defect class and defect classifier can be corrected when a defect class and defect classifier are generated for a certain inspection machine.

FIG. 10(*b*) is a flowchart illustrating the processing steps to be performed for actual data classification. As indicated in FIG. 10(*b*), an actual inspection is sequentially conducted using the defect classifier 120 that is generated from the first defect inspection machine. The inspection by the next defect inspection machine is conducted while subjecting defect samples to sampling as needed as described in conjunction with the third embodiment. As an exceptional case related to FIGS. 10(*a*) and 10(*b*), defect classification or sampling may be conducted using the inspection information that is derived from a plurality of arbitrarily combined defect inspection machines after inspection by the plurality of defect inspection machines. In this case, the inspection information derived from the plurality of defect inspection machines can be used as judgment criteria for the defect classifiers for the plurality of defect inspection machines irrespective of the order of inspection.

As described above, the present invention facilitates the customization of the defect classifier, which was previously difficult, in compliance with a user-specific classification request, and provides a scheme for achieving automatic defect classification in such a manner as to satisfy the user's judgment criteria.

Further, the present invention displays various inspection information in the simultaneous review window to permit the user to conduct a simultaneous review and clarify the user's classification request, thereby making it possible to formulate a consolidated view.

In an inspection conducted using a plurality of defect inspection machines, the present invention also provides hierarchical defect classifiers, thereby allowing the defect classifiers to learn effectively and provide effective review sampling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of classifying defects, comprising the steps of:
   determining a sampling rate of defects to be reviewed by a second inspection machine, operable to detect images of defects to be reviewed with a first image magnification, among defects detected by a first inspection machine, operable to detect images of the defects with a second image magnification, the second image magnification being lower than the first image magnification;
   reviewing, with said second inspection machine, defects sampled from said defects detected by said first inspection machine in accordance with said determined sampling rate, the defects detected by said first inspection machine being captured with the lower second image magnification; and classifying, with said second inspection machine, said reviewed defects with a second defect classifier corresponding to said second inspection machine, the reviewed defects being captured with the higher first image magnification;

wherein in the step of determining, said sampling rate is determined for each defect class classified by a first defect classifier corresponding to said first inspection machine to reduce a number of defects to be reviewed by the second inspection machine among the defects detected by the first inspection machine.

2. The method according to claim 1, wherein said second defect classifier has a decision tree for hierarchically expanding defect classification class elements via branch elements, and wherein said decision tree is such that a classification rule created with sample inspection information that has been previously derived from an inspection of an inspection sample is individually set for each of said branch elements.

3. The method according to claim 2, wherein said individual classification rule that is set for each of said branch elements in said second defect classifier is set on a screen that displays said sample inspection information derived from said inspection of said inspection sample.

4. The method according to claim 1, wherein in the step of determining, said sampling rate is determined for each defect class in accordance with a reliability of each defect class classified with said first defect classifier.

* * * * *

UNITED STATES PATENT AND TRADEMARK OFFICE
CERTIFICATE OF CORRECTION

PATENT NO. : 7,602,962 B2
APPLICATION NO. : 10/762091
DATED : October 13, 2009
INVENTOR(S) : Miyamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Fifth Day of October, 2010

David J. Kappos
*Director of the United States Patent and Trademark Office*